United States Patent
Hayakawa

(10) Patent No.: US 11,613,629 B2
(45) Date of Patent: Mar. 28, 2023

(54) POLYCARBONATE RESIN COMPOSITION PELLET, METHOD FOR PRODUCING PELLET, AND MOLDED ARTICLE THEREOF

(71) Applicant: Mitsubishi Engineering-Plastics Corporation, Minato-ku (JP)

(72) Inventor: Junya Hayakawa, Hiratsuka (JP)

(73) Assignee: Mitsubishi Engineering-Plastics Corporation, Minato-ku (JP)

(*) Notice: Subject to any disclaimer, the term of this patent is extended or adjusted under 35 U.S.C. 154(b) by 197 days.

(21) Appl. No.: 17/046,241

(22) PCT Filed: Feb. 8, 2019

(86) PCT No.: PCT/JP2019/004579
§ 371 (c)(1),
(2) Date: Oct. 8, 2020

(87) PCT Pub. No.: WO2019/198321
PCT Pub. Date: Oct. 17, 2019

(65) Prior Publication Data
US 2021/0032438 A1    Feb. 4, 2021

(30) Foreign Application Priority Data

| | | |
|---|---|---|
| Apr. 9, 2018 | (JP) | JP2018-074839 |
| Apr. 9, 2018 | (JP) | JP2018-074840 |
| May 29, 2018 | (JP) | JP2018-102497 |
| May 29, 2018 | (JP) | JP2018-102498 |
| Aug. 23, 2018 | (JP) | JP2018-156515 |
| Aug. 23, 2018 | (JP) | JP2018-156516 |
| Sep. 4, 2018 | (JP) | JP2018-165433 |
| Sep. 4, 2018 | (JP) | JP2018-165434 |
| Nov. 26, 2018 | (JP) | JP2018-220382 |
| Nov. 26, 2018 | (JP) | JP2018-220383 |
| Nov. 26, 2018 | (JP) | JP2018-220384 |
| Nov. 26, 2018 | (JP) | JP2018-220385 |
| Jan. 25, 2019 | (JP) | JP2019-011382 |
| Jan. 25, 2019 | (JP) | JP2019-011383 |

(51) Int. Cl.
| | |
|---|---|
| C08K 5/526 | (2006.01) |
| C08J 3/20 | (2006.01) |
| C08K 5/05 | (2006.01) |
| C08K 5/06 | (2006.01) |
| C08K 5/101 | (2006.01) |
| C08L 69/00 | (2006.01) |
| G02B 1/04 | (2006.01) |

(52) U.S. Cl.
CPC .............. *C08K 5/526* (2013.01); *C08J 3/201* (2013.01); *C08K 5/05* (2013.01); *C08K 5/06* (2013.01); *C08K 5/101* (2013.01); *C08L 69/00* (2013.01); *G02B 1/045* (2013.01); *C08K 2201/014* (2013.01); *C08L 2201/08* (2013.01)

(58) Field of Classification Search
CPC .. C08L 69/00; C08K 5/05; C08K 5/06; G02B 1/045
See application file for complete search history.

(56) References Cited

U.S. PATENT DOCUMENTS

| | | | |
|---|---|---|---|
| 2007/0082989 A1 | 4/2007 | Glasgow et al. | |
| 2013/0035441 A1* | 2/2013 | de Brouwer | C08J 5/18 525/464 |
| 2016/0122533 A1 | 5/2016 | Tomita et al. | |
| 2018/0201782 A1 | 7/2018 | Egawa | |

FOREIGN PATENT DOCUMENTS

| | | | | |
|---|---|---|---|---|
| EP | 664316 A1 * | 7/1995 | ............... | C08K 5/06 |
| JP | 2001-279085 A | 10/2001 | | |
| JP | 2001-294690 A | 10/2001 | | |
| JP | 2003-171545 A | 6/2003 | | |
| JP | 2006-213744 A | 8/2006 | | |

(Continued)

OTHER PUBLICATIONS

Machine translation of JP 2018028025 (2018, pages).*

(Continued)

*Primary Examiner* — Brieann R Johnston
(74) *Attorney, Agent, or Firm* — Oblon, McClelland, Maier & Neustadt, L.L.P.

(57) ABSTRACT

A polycarbonate resin composition pellet contains a polycarbonate resin (A), an aromatic compound (B) represented by general formula (1) below, and a phosphorus-based stabilizer (C), the aromatic compound (B) being contained in the pellet in an amount of 0.001% to 1% by mass, the phosphorus-based stabilizer (C) being contained in the pellet in an amount of 0.003% to 0.5% by mass:

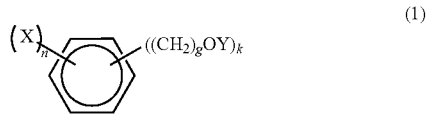

(1)

(where Y is a hydrogen atom or an organic group that does not contain any of nitrogen, sulfur, and halogen elements, when Y is a hydrogen atom, X is an alkyl group or an optionally substituted aryl group, when Y is an organic group, X is an organic group that does not contain any of nitrogen, sulfur, and halogen elements, g is 1 or 2, n is 0 to 5, k is 1 to 4, and k+n is 6 or less.)

18 Claims, No Drawings

(56) References Cited

FOREIGN PATENT DOCUMENTS

| JP | 2009-511666 | A |   | 3/2009 |
|----|-------------|---|---|--------|
| JP | 2015-180709 | A |   | 10/2015 |
| JP | 2016-145325 | A |   | 8/2016 |
| JP | 5975194 | B1 |   | 8/2016 |
| JP | 2017-105978 | A |   | 6/2017 |
| JP | 2017-132910 | A |   | 8/2017 |
| JP | 2017-185681 | A |   | 10/2017 |
| JP | 2018-28025 | A |   | 2/2018 |
| JP | 2018028025 | A | * | 2/2018 |

OTHER PUBLICATIONS

Toagosei (Aron Oxetane OXT-121 Technical Report, Toagosei, 2015, 7 pages).*
Adeka (ADK STAB PEP-36, Adeka, 2009, 2 pages).*
Japanese Office Action dated Aug. 2, 2022 in Japanese Patent Application No. 2019-011382 (with unedited computer generated English Translation), 6 pages.
Japanese Office Action dated Aug. 2, 2022 in Japanese Patent Application No. 2019-011383 (with unedited computer generated English Translation), 6 pages.
Extended European Search Report dated May 3, 2021 in corresponding European Patent Application No. 19785614.9, 7 pages.
Japanese Office Action dated Mar. 8, 2022 in Japanese Patent Application No. 2018-220385 (with unedited computer generated English translation), 6 pages.
International Search Report dated May 14, 2019 in PCT/JP2019/004579 filed on Feb. 8, 2019, 2 pages.
Japanese Office Action dated Nov. 24, 2021 in Japanese Patent Application No. 2018-220384 (with English translation), 6 pages.
Office Action issued in Japanese Patent Application No. 2019-011383, dated Jan. 17, 2023 (w/ English language-machine translation).
Office Action issued in Japanese Patent Application No. 201880072661.1, dated Jan. 17, 2023 (w/ English language-machine translation).

* cited by examiner

POLYCARBONATE RESIN COMPOSITION PELLET, METHOD FOR PRODUCING PELLET, AND MOLDED ARTICLE THEREOF

TECHNICAL FIELD

The present invention relates to polycarbonate resin composition pellets, a production method thereof, and a molded article thereof. Specifically, the present invention relates to polycarbonate resin composition pellets that are suitable as a molding material for light guide members and that are excellent in hue, a production method thereof, and a molded article obtained by molding the polycarbonate resin composition pellets.

BACKGROUND ART

In recent years, for example, in Europe and North America, installation of daytime running lights, which are being switched on all the time, in automotive headlamps and rear lamps has been promoted to increase the conspicuity from pedestrians and oncoming vehicles during the daytime. Such daytime running lights typically include a light guide member and a light source that emits light incident on the light guide member.

It is reported that an aromatic polycarbonate resin composition is used as a material for light guide members. The deterioration of the aromatic polycarbonate resin composition due to heat applied during a molding process may cause the resulting molded article to have a slight tinge of yellow. However, the aromatic polycarbonate resin composition used for light guide members incorporated in automotive lighting devices is required to exhibit a high level of hue, for example, a small yellowness index (YI) value at a length of 300 mm measured for a molded article having an optical path length of 300 mm.

Patent Literature 1 discloses, as an aromatic polycarbonate resin composition excellent in hue and suitable for light guide members incorporated in automotive lighting devices, a composition containing an aromatic polycarbonate resin mixed with a specific phosphorus-based stabilizer and a polyalkylene glycol.

PTL 1: JP2016-145325A

The use of the aromatic polycarbonate resin composition disclosed in Patent Literature 1 makes it possible to obtain a molded article having excellent hue such that the YI value at a length of 300 mm measured for a molded article having an optical path length of 300 mm is 20 or less. However, a further improvement in hue is desired in the use of light guide members incorporated in automotive lighting devices.

SUMMARY OF INVENTION

The present invention aims to provide a polycarbonate resin composition pellet extremely excellent in hue and suitable for a light guide member incorporated in an automotive lighting device, a method for producing the polycarbonate resin composition pellet, and a molded article obtained by molding the polycarbonate resin composition pellet.

The inventors have found that the foregoing problem can be solved by incorporation of a specific aromatic compound and a phosphorus-based stabilizer in a predetermined ratio as the amounts of components in a pellet.

The gist of the present invention is described below.

[1] A polycarbonate resin composition pellet, comprising a polycarbonate resin (A), an aromatic compound (B) represented by general formula (1) below, and a phosphorus-based stabilizer (C), the aromatic compound (B) being contained in the pellet in an amount of 0.001% to 1% by mass, the phosphorus-based stabilizer (C) being contained in the pellet in an amount of 0.003% to 0.5% by mass:

[Chem. 1]

(1)

(where in general formula (1), Y is a hydrogen atom or an organic group that does not contain any of nitrogen, sulfur, and halogen elements, when Y is a hydrogen atom, X is an alkyl group or an optionally substituted aryl group, when Y is an organic group that does not contain any of nitrogen, sulfur, and halogen elements, X is an organic group that does not contain any of nitrogen, sulfur, and halogen elements, in this case, X and Y are optionally the same or different, g is an integer of 1 or 2, n is an integer of 0 to 5, when n is 2 or more, n X groups are optionally the same or different, k is an integer of 1 to 4, and when k is 2 or more, two or more —$(CH_2)_g OY$ groups in which each Y is the organic group are optionally the same or different, provided that n+k is 6 or less.)

[2] The polycarbonate resin composition pellet according to [1], wherein the aromatic compound (B) represented by general formula (1) is represented by general formula (1A) below:

[Chem. 2]

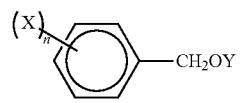

(1A)

(where in general formula (1A), X, Y, and n are as defined in general formula (1) described above.)

[3] The polycarbonate resin composition pellet according to [1] or [2], wherein in general formula (1), X is an alkyl group having 1 to 4 carbon atoms or an optionally substituted phenyl group, and Y is a hydrogen atom.

[4] The polycarbonate resin composition pellet according to [3], wherein the aromatic compound (B) is one or two or more selected from the group consisting of benzyl alcohol (phenylmethanol), 4-phenylbenzyl alcohol (4-phenylphenylmethanol), 2-methylphenylmethanol, 4-mehylphenylmethanol, 4-tert-butylphenylmethanol, and 1,4-benzenedimethanol.

[5] The polycarbonate resin composition pellet according to [1] or [2], wherein in general formula (1), X is an alkyl group or an optionally substituted aryl group, and Y is an alkyl group having 1 to 8 carbon atoms, —$(CH_2)_m OH$ (where m is an integer of 1 to 4), —$CH_2CH_2$—O—$CH_2CH_2$—OH, an optionally substituted phenyl group, a benzyl group optionally having a substituent on a benzene ring, —$CH_2$—

CH=CH$_2$, —C(=O)—(CH$_2$)$_j$—CH$_3$ (where j is an integer of 0 to 3), or —C(=O)—C$_6$H$_5$.

[6] The polycarbonate resin composition pellet according to any one of [1] to [5], further comprising 0.01% to 0.5% by mass of an epoxy compound (D) and/or an oxetane compound (E).

[7] A molded article obtained by molding the polycarbonate resin composition pellet according to any one of [1] to [6].

[8] A method for producing a polycarbonate resin composition pellet, comprising melt-kneading a polycarbonate resin composition containing 100 parts by mass of a polycarbonate resin (A), 0.05 to 2 parts by mass of an aromatic compound (B) represented by general formula (1) below, and 0.003 to 0.5 parts by mass of a phosphorus-based stabilizer (C) to produce a polycarbonate resin composition pellet, the aromatic compound (B) being contained in the pellet in an amount of 0.001% to 1% by mass:

[Chem. 3]

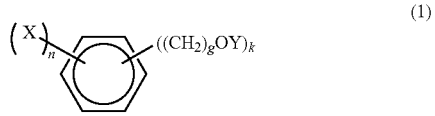
(1)

(where in general formula (1), Y is a hydrogen atom or an organic group that does not contain any of nitrogen, sulfur, and halogen elements, when Y is a hydrogen atom, X is an alkyl group or an aryl group optionally having a substituent, when Y is an organic group that does not contain any of nitrogen, sulfur, and halogen elements, X is an organic group that does not contain any of nitrogen, sulfur, and halogen elements, in this case, X and Y are optionally the same or different, g is an integer of 1 or 2, n is an integer of 0 to 5, when n is 2 or more, n X groups are optionally the same or different, k is an integer of 1 to 4, and when k is 2 or more, two or more —(CH$_2$)$_g$OY groups in which each Y is the organic group are optionally the same or different, provided that n+k is 6 or less.)

[9] The method for producing a polycarbonate resin composition pellet according to [8], wherein the aromatic compound (B) represented by general formula (1) is represented by general formula (1A) below:

[Chem. 4]

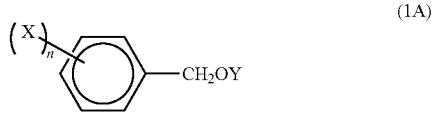
(1A)

(where in general formula (1A), X, Y, and n are as defined in general formula (1) described above.)

[10] The method for producing a polycarbonate resin composition pellet according to [8] or [9], wherein in general formula (1), X is an alkyl group having 1 to 4 carbon atoms or an optionally substituted phenyl group, and Y is a hydrogen atom.

[11] The method for producing a polycarbonate resin composition pellet according to [10], wherein the aromatic compound (B) is one or two or more selected from the group consisting of benzyl alcohol (phenylmethanol), 4-phenyl-benzyl alcohol (4-phenylphenylmethanol), 2-methylphenyl-methanol, 4-mehylphenylmethanol, 4-tert-butylphenyl-methanol, and 1,4-benzenedimethanol.

[12] The method for producing a polycarbonate resin composition pellet according to [8] or [9], wherein in general formula (1), X is an alkyl group or an optionally substituted aryl group, and Y is an alkyl group having 1 to 8 carbon atoms, —(CH$_2$)$_m$OH (where m is an integer of 1 to 4), —CH$_2$CH$_2$—O—CH$_2$CH$_2$—OH, an optionally substituted phenyl group, a benzyl group optionally having a substituent on a benzene ring, —CH$_2$—CH=CH$_2$, —C(=O)—(CH$_2$)$_j$—CH$_3$ (where j is an integer of 0 to 3), or —C(=O)—C$_6$H$_5$.

[13] The method for producing a polycarbonate resin composition pellet according to any one of [8] to [12], wherein the polycarbonate resin composition further contains 0.01 to 0.5 parts by mass of an epoxy compound (D) and/or oxetane compound (E).

[14] The method for producing a polycarbonate resin composition pellet according to any one of [8] to [13], wherein a temperature of the melt kneading is 240° C. to 320° C.

[15] A molded article obtained by molding the pellet produced by the method for producing a polycarbonate resin composition pellet according to any one of [8] to [14].

Advantageous Effects of Invention

According to the present invention, it is possible to provide the polycarbonate resin composition pellet that can provide a molded article having extremely excellent hue in which the YI value at a length of 300 mm measured for a molded article having an optical path length of 300 mm satisfies about 16 or less.

The use of the polycarbonate resin composition pellet of the present invention makes it possible to provide a light guide member having high light transmission efficiency even when the light guide member is long or thick.

DESCRIPTION OF EMBODIMENTS

Embodiments of the present invention will be described in detail below.

[Polycarbonate Resin Composition Pellet and Production Method Thereof]

The polycarbonate resin composition pellet of the present invention (hereinafter, also referred to as a "pellet of the present invention") contains a polycarbonate resin (A), an aromatic compound (B) represented by general formula (1) below, and a phosphorus-based stabilizer (C), the aromatic compound (B) being contained in the pellet in an amount of 0.001% to 1% by mass, the phosphorus-based stabilizer (C) being contained in the pellet in an amount of 0.003% to 0.5% by mass.

The pellet of the present invention may further contain 0.01% to 0.5% by mass of an epoxy compound (D) and/or an oxetane compound (E).

A method of the present invention for producing a polycarbonate resin composition pellet includes melt-kneading a polycarbonate resin composition containing 100 parts by mass of a polycarbonate resin (A), 0.05 to 2 parts by mass of an aromatic compound (B) represented by general formula (1) below, and 0.003 to 0.5 parts by mass of a phosphorus-based stabilizer (C) (hereinafter, also referred to as a "polycarbonate resin composition of the present invention") to produce a polycarbonate resin composition pellet, the aromatic compound (B) being contained in the pellet (hereinafter, also referred to as a "pellet of the present invention") in an amount of 0.001% to 1% by mass.

The polycarbonate resin composition of the present invention may further contain 0.01 to 0.5 parts by mass of an epoxy compound (D) and/or oxetane compound (E).

[Chem. 5]

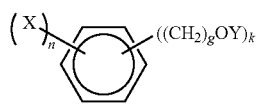
(1)

(where in general formula (1), Y is a hydrogen atom or an organic group that does not contain any of nitrogen, sulfur, and halogen elements, when Y is a hydrogen atom, X is an alkyl group or an optionally substituted aryl group, when Y is an organic group that does not contain any of nitrogen, sulfur, and halogen elements, X is an organic group that does not contain any of nitrogen, sulfur, and halogen elements, in this case, X and Y are optionally the same or different, g is an integer of 1 or 2, n is an integer of 0 to 5, when n is 2 or more, n X groups are optionally the same or different, k is an integer of 1 to 4, and when k is 2 or more, two or more —$(CH_2)_gOY$ groups in which each Y is the organic group are optionally the same or different, provided that n+k is 6 or less.)

The amounts of the aromatic compound (B), phosphorus-based stabilizer (C), the epoxy compound (D), and the oxetane compound (E) contained in the pellet of the present invention are values measured by a method described in Examples below.

<Polycarbonate Resin (A)>

As the polycarbonate resin (A), any known polycarbonate resin can be used. Examples of the polycarbonate resin (A) include aromatic polycarbonate resins, aliphatic polycarbonate resins, and aromatic-aliphatic polycarbonate resins. An aromatic polycarbonate resin is preferred.

<Aromatic Polycarbonate Resin (A)>

The aromatic polycarbonate resin is an aromatic polycarbonate polymer obtained by reacting an aromatic hydroxy compound with phosgene or a diester of carbonic acid. The aromatic polycarbonate polymer may have a branched structure. The method for producing an aromatic polycarbonate resin is not particularly limited. The aromatic polycarbonate resin is produced by a known method such as a phosgene method (interfacial polymerization method) or a melting method (transesterification method).

Examples of the aromatic dihydroxy compound include bis(4-hydroxyphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl) propane, 2,2-bis(4-hydroxy-3,5-dibromophenyl)propane, 4,4-bis(4-hydroxyphenyl)heptane, 1,1-bis(4-hydroxyphenyl)cyclohexane, 4,4'-dihydroxybiphenyl, 3,3',5,5'-tetramethyl-4,4'-dihydroxybiphenyl, bis(4-hydroxyphenyl)sulfone, bis(4-hydroxyphenyl)sulfide, bis(4-hydroxyphenyl) ether, and bis(4-hydroxyphenyl) ketone.

Among the aromatic dihydroxy compounds, 2,2-bis(4-hydroxyphenyl)propane (bisphenol A) is particularly preferred.

The aromatic dihydroxy compounds may be used alone or in combination of two or more as a mixture.

In the production of the aromatic polycarbonate resin, for example, a polyhydric phenol intramolecularly having three or more hydroxy groups may be further added in a small amount in addition to the aromatic dihydroxy compound. In this case, the aromatic polycarbonate resin has a branched structure.

Examples of the polyhydric phenol having three or more hydroxy groups include polyhydroxy compounds such as phloroglucin, 4,6-dimethyl-2,4,6-tris(4-hydroxyphenyl)heptene-2, 4,6-dimethyl-2,4,6-tris(4-hydroxyphenyl)heptane, 2,6-dimethyl-2,4,6-tris(4-hydroxyphenyl)heptene-3, 1,3,5-tris(4-hydroxyphenyl)benzene, and 1,1,1-tris(4-hydroxyphenyl)ethane; and 3,3-bis(4-hydroxyaryl)oxyindole (i.e., isatin bisphenol), 5-chloroisatin, 5,7-dichloroisatin, and 5-bromoisatin. In particular, 1,1,1-tris(4-hydroxyphenyl) ethane or 1,3,5-tris(4-hydroxyphenyl)benzene is preferred. The amount of polyhydric phenol used is preferably 0.01 to 10 mol % and more preferably 0.1 to 2 mol % based on the aromatic dihydroxy compound (100 mol %).

In the polymerization performed by a transesterification method, a diester of carbonic acid is used as a monomer instead of the phosgene. Examples of the diester of carbonic acid include substituted diaryl carbonates such as diphenyl carbonate and ditolyl carbonate, and dialkyl carbonates such as dimethyl carbonate, diethyl carbonate, and di-tert-butyl carbonate. These diesters of carbonic acid may be used alone or in combination of two or more as a mixture. In particular, diphenyl carbonate and substituted diphenyl carbonate are preferred.

The diester of carbonic acid may be replaced with dicarboxylic acid or a dicarboxylic acid ester in an amount of preferably 50 mol % or less and more preferably 30 mol % or less. Examples of the dicarboxylic acid or the dicarboxylic acid ester include terephthalic acid, isophthalic acid, diphenyl terephthalate, and diphenyl isophthalate. When a part of the diester of carbonic acid is replaced with dicarboxylic acid or a dicarboxylic acid ester, polyester carbonate is obtained.

When the aromatic polycarbonate resin is produced by a transesterification method, a catalyst is normally used. The type of catalyst is not limited, but the catalyst is generally a basic compound such as an alkali metal compound, an alkaline-earth metal compound, a basic boron compound, a basic phosphorus compound, a basic ammonium compound, or an amine compound. In particular, an alkali metal compound and/or an alkaline-earth metal compound is preferred. These compounds may be used alone or in combination of two or more. In the transesterification method, the catalyst is generally deactivated using, for example, a p-toluenesulfonate.

The aromatic polycarbonate resin may be copolymerized with a polymer or oligomer having a siloxane structure for the purpose of imparting flame retardancy or the like.

The polycarbonate resin (A) preferably has a viscosity-average molecular weight of 10,000 to 22,000. If the viscosity-average molecular weight of the polycarbonate resin (A) is less than 10,000, the molded article obtained has insufficient mechanical strength. Consequently, a molded article having sufficient mechanical strength sometimes cannot be obtained. If the viscosity-average molecular weight of the polycarbonate resin (A) is more than 22,000, the melt viscosity of the polycarbonate resin (A) increases. In this case, for example, when a long molded article such as a light guide member is produced by a method such as injection molding of the pellets of the present invention, excellent fluidity sometimes cannot be achieved. Furthermore, the amount of heat generated by shearing of the resin increases, and the resin deteriorates through thermal decomposition. As a result, a molded article having an excellent hue sometimes cannot be obtained.

The viscosity-average molecular weight of the polycarbonate resin (A) is more preferably 12,000 to 18,000 and further preferably 14,000 to 17,000.

The viscosity-average molecular weight of the polycarbonate resin (A) is determined from the solution viscosity measured at 20° C. using methylene chloride as a solvent.

The polycarbonate resin (A) may be a mixture of two or more polycarbonate resins having different viscosity-average molecular weights. The polycarbonate resin (A) may be mixed with a polycarbonate resin having a viscosity-average molecular weight outside the above range as long as the resulting viscosity-average molecular weight is within the above range.

The pellet of the present invention is a pellet composed of the polycarbonate resin composition and usually contains the polycarbonate resin (A) as a main component in an amount of 95% or more by mass, preferably 97% or more by mass, more preferably 99% or more by mass.

<Aromatic Compound (B)>

The aromatic compound (B) used in the present invention is a compound represented by general formula (1) below.

[Chem. 6]

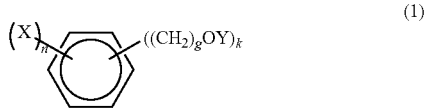

(1)

(where in general formula (1), Y is a hydrogen atom or an organic group that does not contain any of nitrogen, sulfur, and halogen elements, when Y is a hydrogen atom, X is an alkyl group or an optionally substituted aryl group, when Y is an organic group that does not contain any of nitrogen, sulfur, and halogen elements, X is an organic group that does not contain any of nitrogen, sulfur, and halogen elements, in this case, X and Y are optionally the same or different, g is an integer of 1 or 2, n is an integer of 0 to 5, when n is 2 or more, n X groups are optionally the same or different, k is an integer of 1 to 4, and when k is 2 or more, two or more —(CH$_2$)$_g$OY groups in which each Y is the organic group are optionally the same or different, provided that n+k is 6 or less.)

The pellet of the present invention contains the aromatic compound (B) and thus has an excellent effect of improving the hue.

In general formula (1), in the case where k=2, i.e., where two CH$_2$OY groups are contained, the substitution positions of the CH$_2$OY groups are preferably the 1,4-positions.

In general formula (1), g and k are each preferably 1 from the viewpoint of the effect of improving the hue. Accordingly, the aromatic compound (B) represented by general formula (1) is preferably a benzyloxy-based compound or benzyl alcohol-based compound represented by general formula (1A).

[Chem. 7]

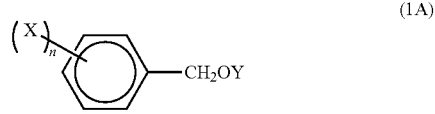

(1A)

(where in general formula (1A), X, Y, and n are as defined in general formula (1) described above.)

In general formulae (1) and (1A), when each of X and Y is an organic group that does not contain any of nitrogen, sulfur, and halogen elements, any organic group may be used, as long as it does not contain any of nitrogen, sulfur, and halogen elements causing coloration. Examples of the organic group include usually, but are not particularly limited to, substituents each composed of a carbon atom and a hydrogen atom; and substituents each composed of a carbon atom, a hydrogen atom, and an oxygen atom. Specific examples thereof include alkyl groups, aryl groups, aralkyl groups, alkenyl groups, alkynyl groups, alkoxy groups, and groups in which hydroxy groups, ether groups, and other groups are introduced into these groups.

When Y is an organic group that does not contain any of nitrogen, sulfur, and halogen elements, X is particularly preferably an alkyl group or an optionally substituted aryl group.

When Y is a hydrogen atom or an organic group that does not contain any of nitrogen, sulfur, and halogen elements, an aryl group for X is preferably a phenyl group. The phenyl group may have an alkyl group as a substituent. Examples of the alkyl group include those described below as the alkyl group for X.

When Y is a hydrogen atom or an organic group that does not contain any of nitrogen, sulfur, and halogen elements, as the alkyl group for X is preferably an alkyl group having 1 to 10 carbon atoms, more preferably an alkyl group having 1 to 4 carbon atoms. The alkyl group for X may be a linear alkyl group, a branched alkyl group, or a cyclic alkyl group, preferably a linear or branched chain alkyl group.

In general formulae (1) and (1A), n that represents the number of the X substituents is 0 to 4.

When Y is a hydrogen atom, n is preferably 0 to 3, more preferably 0 to 2, particularly preferably 0 (unsubstituted) or 1.

When n is 2 or more, multiple X substituents may be the same or different from each other.

Regarding the substitution position of X, when one —CH$_2$OY group is contained, the ortho- and/or meta-position to the —CH$_2$OY group is preferred.

(In the Case of Y Being Hydrogen Atom)

In the case of an aromatic alcohol in which each Y in general formulae (1) and (1A) is a hydrogen atom, specific examples of a benzyl alcohol-based compound in which k=1 include benzyl alcohol (phenylmethanol), 4-methylphenylmethanol, 2-methylphenylmethanol, 3-methylphenylmethanol, 4-ethylphenylmethanol, 2-ethylphenylmethanol, 4-isopropylphenylmethanol, 4-tert-butylphenylmethanol, 4-phenylbenzyl alcohol (4-phenylphenylmethanol), 3-phenylphenylmethanol, 2,3-dimethylphenylmethanol, 2,4-dimethylphenylmethanol, 2-methyl-3-phenylphenylmethanol, 3,5-tert-butylphenylmethanol, 2,4,6-trimethylphenylmethanol, and 2,3,5,6-tetramethylphenylmethanol.

Specific examples of a benzenedimethanol-based compound in which k=2 include 1,4-benzenedimethanol, 1,3-benzenedimethanol, and 1,2-benzenedimethanol.

Among these, preferred are benzyl alcohol, 4-phenylbenzyl alcohol, 2-methylphenylmethanol, 4-methylphenylmethanol, 4-tert-butylphenylmethanol, and 1,4-benzenedimethanol.

(In the Case of Y Being Organic Group)

When each Y in general formulae (1) and (1A) is an organic group that does not contain any of nitrogen, sulfur, and halogen elements, preferred examples of Y include alkyl groups, alkenyl groups, alkylcarbonyl groups, optionally substituted arylcarbonyl groups, hydroxyalkyl groups, hydroxyalkyloxyalkyl groups, optionally substituted aryl groups, and benzyl groups each optionally having a substituent on a benzene ring.

An alkyl group for Y is preferably an alkyl group having 1 to 8 carbon atoms, more preferably an alkyl group having 1 to 4. The alkyl group for Y may be a linear alkyl group, a branched alkyl group, or a cyclic alkyl group, preferably a linear or branched chain alkyl group.

An alkynyl group for Y is preferably an alkenyl group having 2 to 5 carbon atoms, more preferably an allyl group (—CH$_2$—CH═CH$_2$).

An alkylcarbonyl group for Y is preferably an alkylcarbonyl group having 2 to 5 (—C(═O)—(CH$_2$)$_j$—CH$_3$ (where j is an integer of 0 to 3)).

An example of an arylcarbonyl group for Y is an optionally substituted phenylcarbonyl group (—C(═O)—C$_6$H$_5$).

An aryl group for Y is preferably a phenyl group.

Examples of a hydroxyalkyl group include groups represented by —(CH$_2$)$_m$OH (where m is an integer of 1 to 4).

An example of a hydroxyalkyloxyalkyl group is —CH$_2$CH$_2$—O—CH$_2$CH$_2$—OH.

Examples of substituents optionally attached to benzene rings of an aryl group such as a phenyl group, a benzyl group, and so forth contained in Y include alkyl groups. Examples of the alkyl groups include those described above as the alkyl group for X.

Y is preferably an alkyl group such as a methyl group, a benzyl group, a hydroxymethyl group (—CH$_2$OH), a hydroxyethyl group (—C$_2$H$_4$OH), —CH$_2$—CH═CH$_2$, —C(═O)—(CH$_2$)$_j$—CH$_3$ (where j is an integer of 0 to 3), or —C(═O)—C$_6$H$_5$.

Specific examples of the aromatic compound (B) in which Y is an organic group that does not contain any of nitrogen, sulfur, and halogen elements include dibenzyl ether (C$_6$H$_5$—CH$_2$—O—CH$_2$—C$_6$H$_5$), benzyl methyl ether (C$_6$H$_5$—CH$_2$—O—CH$_3$), 2-benzyloxyethanol (C$_6$H$_5$—CH$_2$—O—C$_2$H$_4$OH), allyl benzyl ether (C$_6$H$_5$—CH$_2$—O—CH$_2$—CH═CH$_2$), benzyl acetate (C$_6$H$_5$—CH$_2$—O—C(═O)—CH$_3$), benzyl benzoate (C$_6$H$_5$—CH$_2$—O—C(═O)—C$_6$H$_5$), benzyl butyrate (C$_6$H$_5$—CH$_2$—O—C(═O)—C$_3$H$_7$), and 1,4-bis(methoxymethyl)benzene (CH$_3$—O—CH$_2$—C$_6$H$_4$—CH$_2$—O—CH$_3$). Among these, preferred are dibenzyl ether, benzyl methyl ether, and 2-benzyloxyethanol.

These aromatic compounds (B) may be used alone or in combination of two or more.

The amount of the aromatic compound (B) contained in the pellet of the present invention is 0.001% to 1% by mass.

At an excessively large amount of the aromatic compound (B) contained in the pellet, the resulting molded article may be cloudy and may have deteriorated durability to heat and light. Accordingly, the aromatic compound (B) is contained in the pellet in the above range.

To achieve the amount of the aromatic compound (B) contained in the pellet of the present invention within the above range, the polycarbonate resin composition of the present invention contains 0.05 to 2 parts by mass, preferably 0.05 to 1 part by mass, more preferably 0.1 to 0.5 parts by mass of the aromatic compound (B) based on 100 parts by mass of the polycarbonate resin (A).

<Phosphorus-Based Stabilizer (C)>

Preferred examples of the phosphorus-based stabilizer (C) include a phosphite-based stabilizer (C-I) having a Spiro ring skeleton (hereinafter, also referred to simply as a "phosphite-based stabilizer (C-I)") and a phosphite-based stabilizer (C-II) represented by general formula (II) (hereinafter, also referred to simply as a "phosphite-based stabilizer (C-II)"). These may be used alone or in combination of two or more. In particular, the phosphite-based stabilizer (C-I) and the phosphite-based stabilizer (C-II) are preferably used in combination.

[Chem. 8]

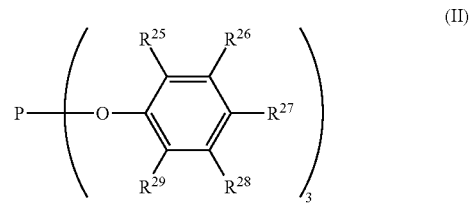

(II)

(In the formula (II), $R^{25}$ to $R^{29}$ each independently represent a hydrogen atom, an aryl group having 6 to 20 carbon atoms, or an alkyl group having 1 to 20 carbon atoms.)

<Phosphite Stabilizer (C-I)>

The phosphite stabilizer (C-I) may be any phosphite compound having a Spiro ring skeleton. For example, the phosphite stabilizer (C-I) is preferably represented by general formula (I) below.

[Chem. 9]

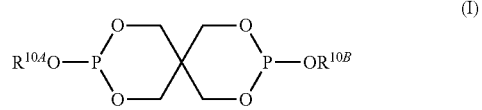

(I)

(In the formula (I), $R^{10A}$ and $R^{10B}$ each independently represent an alkyl group having 1 to 30 carbon atoms or an aryl group having 6 to 30 carbon atoms.)

In the general formula (I), the alkyl groups represented by $R^{10A}$ and $R^{10B}$ preferably each independently represent a linear or branched alkyl group having 1 to 10 carbon atoms. When $R^{10A}$ and $R^{10B}$ represent an aryl group, an aryl group represented by any one of general formulae (I-1), (I-2), and (I-3) below is preferred.

[Chem. 10]

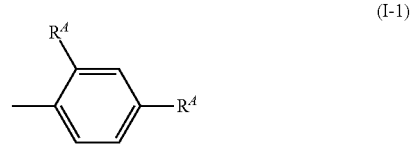

(I-1)

(I-2)

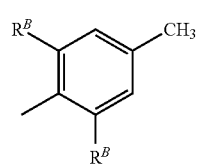

(I-3)

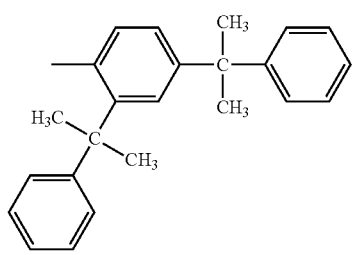

(In the formula (I-1), $R^A$ represents an alkyl group having 1 to 10 carbon atoms. In the formula (I-2), $R^B$ represents an alkyl group having 1 to 10 carbon atoms.)

Examples of the phosphite stabilizer (C-I) include bis(2,6-di-tert-butyl-4-methylphenyl)pentaerythritol diphosphite represented by structural formula (I-A) below.

[Chem. 11]

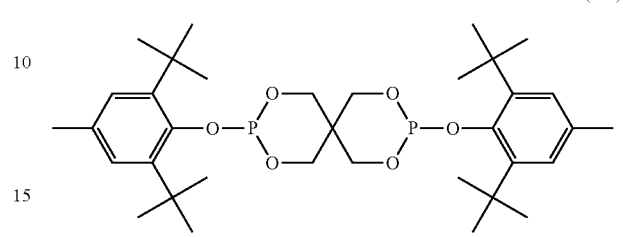

(I-A)

As the phosphite stabilizer (C-I) compounds represented by the following formula (I-B) are also preferred.

[Chem. 12]

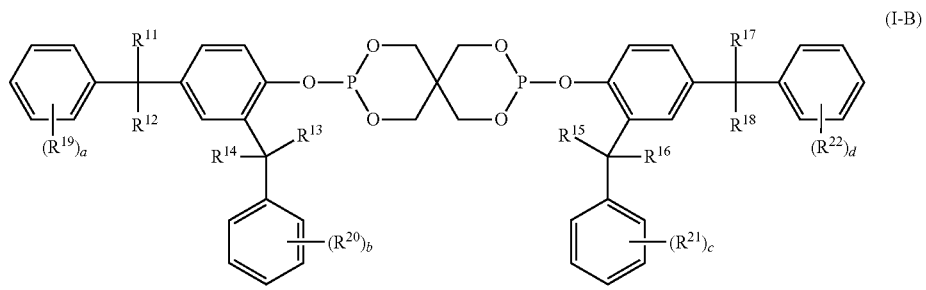

(I-B)

In the formula (I-B), $R^{11}$ to $R^{18}$ are each independently a hydrogen atom or an alkyl group, $R^{19}$ to $R^{22}$ are each independently an alkyl group, an aryl group or an aralkyl group, and a to d are each independently an integer of 0 to 3.

In the general formula (I-B), $R^{11}$ to $R^{18}$ are preferably each independently an alkyl group having 1 to 5 carbon atoms, and are preferably methyl groups. The letters a to d are preferably 0.

The compound represented by the following formula (I-B) is preferably bis(2,4-dicumylphenyl)pentaerythritol diphosphite represented by the following structural formula (I-b):

[Chem. 13]

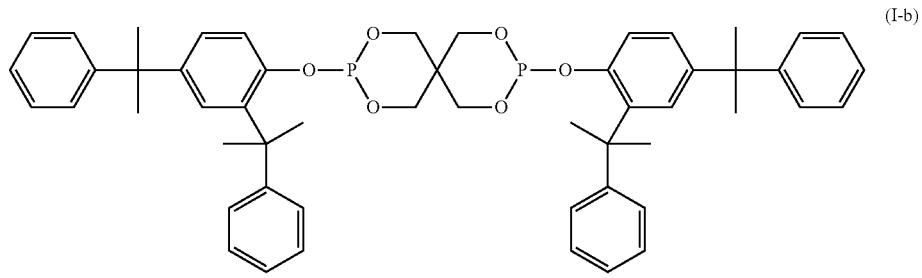

(I-b)

The phosphite stabilizers (C-I) may be used alone or in combination of two or more.

<Phosphite stabilizer (C-II)>

The phosphite stabilizer (C-II) is represented by the general formula (II).

In the general formula (II), examples of the alkyl group represented by $R^{25}$ to $R^{29}$ include a methyl group, an ethyl group, a propyl group, a n-propyl group, a n-butyl group, a tert-butyl group, a hexyl group, and an octyl group.

The phosphite stabilizer (C-II) is particularly preferably tris(2,4-di-tert-butylphenyl) phosphite represented by structural formula (II-A) below.

[Chem. 14]

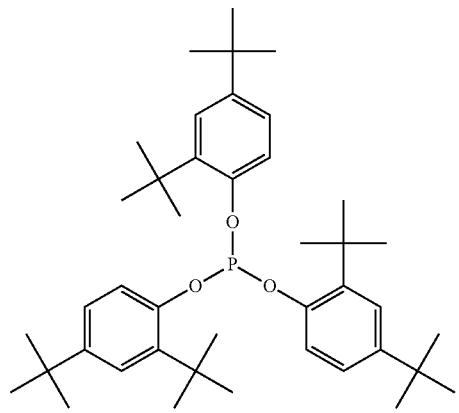

(II-A)

The phosphite stabilizers (C-II) may be used alone or in combination of two or more.

<Amount of Phosphorus-Based Stabilizer (C) Contained in Pellet>

The amount of the phosphorus-based stabilizer (C) contained in the pellet of the present invention is 0.003% to 0.5% by mass, preferably 0.005% to 0.45% by mass, more preferably 0.01% to 0.4% by mass, even more preferably 0.03% to 0.3% by mass. When the amount of the phosphorus-based stabilizer (C) contained in the pellet is less than the lower limit, the effect of the incorporation of the phosphorus-based stabilizer (C) on an improvement in hue cannot be obtained. When the amount of the phosphorus-based stabilizer (C) contained in the pellet is more than the upper limit, the hue may deteriorate. Additionally, the resulting molded article may have lower light transmittance because of an increase in the amount of gas during molding and the occurrence of transfer failure due to mold deposit.

When the phosphite-based stabilizer (C-I) and the phosphite-based stabilizer (C-II) are used in combination, for a similar reason, the amount of the phosphite-based stabilizer (C-I) contained in the pellet of the present invention is preferably 0.001% to 0.5% by mass, more preferably 0.003% to 0.3% by mass, even more preferably 0.005% to 0.2% by mass, the amount of the phosphite-based stabilizer (C-II) contained is preferably 0.001~% to 0.5% by mass, more preferably 0.003% to 0.3% by mass, even more preferably 0.005% to 0.2% by mass, and the sum of these is preferably within the above range.

To more effectively obtain the effect of the use of the phosphite-based stabilizer (C-I) and the phosphite-based stabilizer (C-II) in combination, the ratio by mass of the amount of the phosphite-based stabilizer (C-I) contained to the phosphite-based stabilizer (C-II) contained in the pellet of the present invention is preferably 1:1 to 15, particularly 1:1.5 to 10, especially 1:2 to 5.

<Amount of Phosphorus-Based Stabilizer (C) Contained in Polycarbonate Resin Composition>

The amount of the phosphorus-based stabilizer (C) contained in the polycarbonate resin composition of the present invention is 0.003 to 0.5 parts by mass, preferably 0.005 to 0.45 parts by mass, more preferably 0.01 to 0.4 parts by mass, even more preferably 0.03 to 0.3 parts by mass based on 100 parts by mass of the polycarbonate resin (A). When the amount of the phosphorus-based stabilizer (C) contained in the polycarbonate resin composition is less than the lower limit, the effect of the incorporation of the phosphorus-based stabilizer (C) on an improvement in hue cannot be obtained. When the amount of the phosphorus-based stabilizer (C) contained in the polycarbonate resin composition is more than the upper limit, the hue may deteriorate. Additionally, the resulting molded article may have lower light transmittance because of an increase in the amount of gas during molding and the occurrence of transfer failure due to mold deposit.

When the phosphite-based stabilizer (C-I) and the phosphite-based stabilizer (C-II) are used in combination, for a similar reason, the amount of the phosphite-based stabilizer (C-I) contained in the polycarbonate resin composition is preferably 0.001 to 0.5 parts by mass, more preferably 0.003 to 0.3 parts by mass, even more preferably 0.005 to 0.2 parts by mass, based on 100 parts by mass of the polycarbonate resin (A), the amount of the phosphite-based stabilizer (C-II) contained is preferably 0.001 to 0.5 parts by mass, more preferably 0.003 to 0.3 parts by mass, even more preferably 0.005 to 0.2 parts by mass, and the sum of these is preferably within the above range.

To more effectively obtain the effect of the use of the phosphite-based stabilizer (C-I) and the phosphite-based stabilizer (C-II) in combination, the ratio by mass of the amount of the phosphite-based stabilizer (C-I) contained to the phosphite-based stabilizer (C-II) contained in the polycarbonate resin composition of the present invention is preferably 1:1 to 15, particularly 1:1.5 to 10, especially 1:2 to 5.

<Epoxy Compound (D) and Oxetane Compound (E)>

The pellet of the present invention and the polycarbonate resin composition of the present invention may contain the epoxy compound (D) and/or the oxetane compound (E).

The incorporation of the epoxy compound (D) and/or the oxetane compound (E) in the pellet of the present invention and in the polycarbonate resin composition of the present invention enables the satisfactory hue and the high level of resistance to thermal discoloration to be further improved.

<Epoxy Compound (D)>

The epoxy compound (D) is a compound having one or more epoxy groups in one molecule. Specific preferred examples of the compound include phenyl glycidyl ether, allyl glycidyl ether, t-butylphenyl glycidyl ether, 3,4-epoxycyclohexylmethyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexylethylene oxide, cyclohexylmethyl-3,4-epoxycyclohexyl carboxylate, 3,4-epoxy-6-methylcyclohexylmethyl-6'-methylcyclohexyl carboxylate, bisphenol A diglycidyl ether, tetrabromobisphenol A glycidyl ether, diglycidyl phthalate, diglycidyl hexahydrophthalate, bis-epoxydicyclopentadienyl ether, bis-epoxyethylene glycol, bis-epoxycyclohexyl adipate, butadiene diepoxide, tetraphenylethylene epoxide, octyl epoxy tallate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexyl carboxylate, N-butyl-2,2-dimethyl-3,4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic anhydride, 3-t-butyl-4,5-epoxytetrahydrophthalic anhydride, diethyl-4,5-epoxy-cis-1,2-cyclohexyl dicarboxylate, di-n-butyl-3-t-butyl-4,5-epoxy-cis-1,2-cyclohexyl dicarboxylate, epoxidized soybean oil, and epoxidized linseed oil. In particular, an alicyclic epoxy compound having two or more epoxy groups in one molecule is preferred.

The epoxy compounds (D) may be used alone or in combination of two or more.

<Oxetane Compound (E)>

As the oxetane compound, any compound having one or more oxetane groups in its molecule can be used. Both a mono-oxetane compound having one oxetane group in its molecule and a bi- or higher functional poly-oxetane compound having two or more oxetane groups in its molecule can be used.

Preferred examples of the mono-oxetane compound include compounds represented by general formulae (III-a) and (III-b) below. Preferred examples of the poly-oxetane compound include dioxetane compounds, each having two oxetane groups in its molecule, represented by general formula (IV) below.

[Chem. 15]

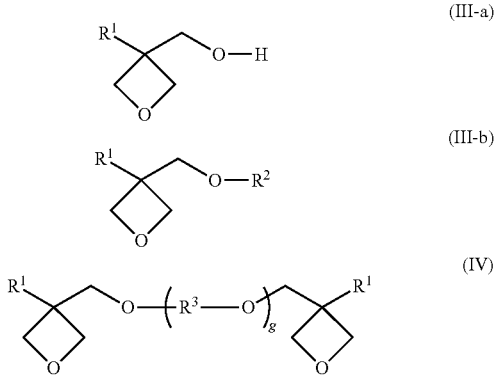

(where in the formulae, each $R^1$ is a divalent organic group optionally having an alkyl group, $R^2$ is a divalent organic group optionally having an alkyl group or a phenyl group, $R^3$ is a divalent organic group optionally having an aromatic ring, and n is 0 or 1.)

In general formulae (III-a), (III-b), and (IV), each $R^1$ is an alkyl group, preferably an alkyl group having 1 to 6 carbon atoms, preferably a methyl group or an ethyl group, particularly preferably an ethyl group.

In general formula (III-b), $R^2$ is an alkyl group or a phenyl group, preferably an alkyl group having 2 to 10 carbon atoms, may be a linear alkyl group, a branched alkyl group, an alicyclic alkyl group, or a linear or branched alkyl group having an ether linkage (etheric oxygen atom) in the middle of the alkyl chain. Specific examples of $R^2$ include an ethyl group, a propyl group, a butyl group, a pentyl group, a hexyl group, a heptyl group, an octyl group, a 2-ethylhexyl group, a nonyl group, a decyl group, a 3-oxypentyl group, a cyclohexyl group, and a phenyl group. Among these, $R^2$ is preferably a 2-ethylhexyl group, a phenyl group, or a cyclohexyl group.

Specific examples of the compound represented by general formula (III-a) include, preferably, 3-hydroxymethyl-3-methyloxetane, 3-hydroxymethyl-3-ethyloxetane, 3-hydroxymethyl-3-propyloxetane, 3-hydroxymethyl-3-n-butyloxetane, and 3-hydroxymethyl-3-propyloxetane. Among these, 3-hydroxymethyl-3-methyloxetane, 3-hydroxymethyl-3-ethyloxetane, and so forth are particularly preferred.

A specific examples of the compound represented by general formula (III-b) is, particularly preferably, 3-ethyl-3-(2-ethylhexyloxymethyl)oxetane.

In general formula (IV), $R^3$ is a divalent organic group optionally having an aromatic ring. Examples thereof include linear or branched alkylene groups having 1 to 12 carbon atoms, such as an ethylene group, a propylene group, a butylene group, a neopentylene group, a n-pentamethylene group, and a n-hexamethylene group, a phenylene group, a divalent groups represented by a formula —$CH_2$-Ph-$CH_2$— or —$CH_2$-Ph-Ph-$CH_2$— (where Ph is a phenyl group), hydrogenated bisphenol A residues, hydrogenated bisphenol F residues, hydrogenated bisphenol Z residues, cyclohexanedimethanol residues, and tricyclodecanedimethanol residues.

Specific examples of the compound represented by general formula (IV) include, particularly preferably, bis(3-methyl-3-oxetanylmethyl) ether, bis(3-ethyl-3-oxetanylmethyl) ether, bis(3-propyl-3-oxetanylmethyl) ether, bis(3-butyl-3-oxetanylmethyl) ether, 1,4-bis[(3-ethyl-3-oxetanylmethoxy)methyl]benzene, 3-ethyl-3{[(3-ethyloxetan-3-yl)methoxy]methyl}oxetane, 4,4'-bis[(3-ethyl-3-oxetanyl)methoxymethyl]biphenyl, and 1,4-bis[(3-ethyl-3-oxetanyl)methoxymethyl]benzene.

The oxetane compounds (E) may be used alone or in combination of two or more.

<Amount of Epoxy Compound (D) and/or Oxetane Compound (E) Contained in Pellet>

When the pellet of the present invention contains the epoxy compound (D) and/or the oxetane compound (E), the amount contained (the total amount when both the epoxy compound (D) and the oxetane compound (E) are contained) is preferably 0.01% to 0.5% by mass, more preferably 0.003% to 0.3% by mass, particularly preferably 0.005% to 0.2% by mass. When the amount of the epoxy compound (D) and/or the oxetane compound (E) is less than the lower limit, the effect of the incorporation of the epoxy compound (D) and/or the oxetane compound (E) on an improvement in hue cannot be sufficiently obtained. At an amount of more than the upper limit, the hue may deteriorate. Additionally, the hygrothermal stability tends to deteriorate.

<Amount of Epoxy Compound (D) and/or Oxetane Compound (E) Contained in Polycarbonate Resin Composition>

When the polycarbonate resin composition of the present invention contains the epoxy compound (D) and/or the oxetane compound (E), the amount contained (the total amount when both the epoxy compound (D) and the oxetane compound (E) are contained) is preferably 0.01 to 0.5 parts by mass, more preferably 0.003 to 0.3 parts by mass, particularly preferably 0.005 to 0.2 parts by mass based on 100 parts by mass of the polycarbonate resin (A). When the amount of the epoxy compound (D) and/or the oxetane compound (E) is less than the lower limit, the effect of the incorporation of the epoxy compound (D) and/or the oxetane compound (E) on an improvement in hue cannot be sufficiently obtained. At an amount of more than the upper limit, the hue may deteriorate. Additionally, the hygrothermal stability tends to deteriorate.

<Other Components>

The pellet of the present invention and the polycarbonate resin composition of the present invention may be further mixed with, as an optional component, for example, an antioxidant, a release agent, an ultraviolet absorber, a fluorescent whitening agent, a dye, a pigment, a flame retardant, an impact modifier, an antistatic agent, a lubricant, a plasticizer, a compatibilizer, or a filler, to the extent that the object of the present invention is not impaired.

Examples of the optional component include polyalkylene glycol compounds described below.

A preferred example of the polyalkylene glycol compounds is a polyalkylene glycol copolymer (CP) containing a linear alkylene ether unit (P1) represented by general formula (2) below and a branched alkylene ether unit (P2) selected from units represented by general formulae (2A) to (2D) below.

[Chem. 16]

(2)

In general formula (2), t is an integer of 3 to 6.

[Chem. 17]

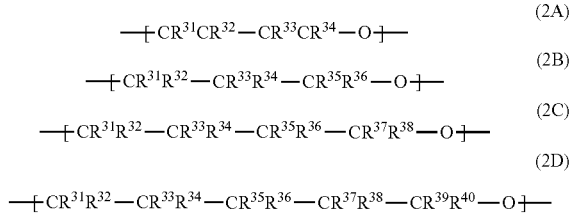

In general formulae (2A) to (2D), $R^{31}$ to $R^{40}$ are each independently a hydrogen atom or an alkyl group having 1 to 3 carbon atoms. In general formulae (2A) to (2D), at least one of $R^{31}$ to $R^{40}$ is an alkyl group having 1 to 3 carbon atoms.

Letting the linear alkylene ether unit (P1) represented by general formula (2) be glycol, examples thereof include trimethylene glycol when t is 3; tetramethylene glycol when t is 4; pentamethylene glycol when t is 5; and hexamethylene glycol when t is 6. Trimethylene glycol and tetramethylene glycol are preferred. Tetramethylene glycol is particularly preferred.

Trimethylene glycol is industrially produced by a method in which ethylene oxide is subjected to hydroformylation to obtain 3-hydroxypropionaldehyde, followed by hydrogenation or a method in which 3-hydroxypropionaldehyde obtained by hydration of acrolein is hydrogenated in the presence of a Ni catalyst. Trimethylene glycol may be produced by a bioprocess in which, for example, glycerol, glucose, or starch is reduced using microorganisms.

Letting the branched alkylene ether unit represented by general formula (2A) be glycol, examples thereof include (2-methyl)ethylene glycol(propylene glycol), (2-ethyl)ethylene glycol (butylene glycol), and (2,2-dimethyl)ethylene glycol (neopentyl glycol).

Letting the branched alkylene ether unit represented by general formula (2B) be glycol, examples thereof include (2-methyl)trimethylene glycol, (3-methyl)trimethylene glycol, (2-ethyl)trimethylene glycol, (3-ethyl)triethylene glycol, (2,2-dimethyl)trimethylene glycol, (2,2-methylethyl) trimethylene glycol, (2,2-diethyl)trimethylene glycol (i.e., neopentyl glycol), (3,3-dimethyl)trimethylene glycol, (3,3-methylethyl)trimethylene glycol, and (3,3-diethyl)trimethylene glycol.

Letting the branched alkylene ether unit represented by general formula (2C) be glycol, examples thereof include (3-methyl)tetramethylene glycol, (4-methyl)tetramethylene glycol, (3-ethyl)tetramethylene glycol, (4-ethyl)tetramethylene glycol, (3,3-dimethyl)tetramethylene glycol, (3,3-methylethyl)tetramethylene glycol, (3,3-diethyl)tetramethylene glycol, (4,4-dimethyl)tetramethylene glycol, (4,4-methylethyl)tetramethylene glycol, and (4,4-diethyl)tetramethylene glycol. (3-Methyl)tetramethylene glycol is preferred.

Letting the branched alkylene ether unit represented by general formula (2D) be glycol, examples thereof include (3-methyl)pentamethylene glycol, (4-methyl)pentamethylene glycol, (5-methyl)pentamethylene glycol, (3-ethyl)pentamethylene glycol, (4-ethyl)pentamethylene glycol, (5-ethyl)pentamethylene glycol, (3,3-dimethyl)pentamethylene glycol, (3,3-methylethyl)pentamethylene glycol, (3,3-diethyl)pentamethylene glycol, (4,4-dimethyl)pentamethylene glycol, (4,4-methylethyl)pentamethylene glycol, (4,4-diethyl)pentamethylene glycol, (5,5-dimethyl)pentamethylene glycol, (5,5-methylethyl)pentamethylene glycol, and (5,5-diethyl)pentamethylene glycol.

While the units, each constituting the branched alkylene ether unit (P2), represented by general formulae (2A) to (2D) have been described above by taking glycol as an example for the sake of convenience, the unit is not limited to those glycols. Alkylene oxides thereof and polyether-forming derivatives thereof may be used.

Preferred examples of the polyalkylene glycol copolymer (CP) include a copolymer composed of a tetramethylene ether (tetramethylene glycol) unit and a unit represented by general formula (2A). In particular, a copolymer composed of a tetramethylene ether (tetramethylene glycol) unit and a 2-methylethylene ether (propylene glycol) unit and/or (2-ethyl)ethylene glycol (butylene glycol) unit is preferred. A copolymer composed of a tetramethylene ether unit and a 2,2-dimethyltrimethylene ether unit, i.e., a neopentyl glycol ether unit is also preferred.

The polyalkylene glycol copolymer (CP) containing the linear alkylene ether unit (P1) and the branched alkylene ether unit (P2) can be produced by a known method and usually by polycondensation of a glycol, an alkylene oxide, or a polyether-forming derivative as described above in the presence of an acid catalyst.

The polyalkylene glycol copolymer (CP) may be a random copolymer or a block copolymer.

An end group of the polyalkylene glycol copolymer (CP) is preferably a hydroxy group. Even if one or both ends of the polyalkylene glycol copolymer (CP) are capped with, for example, alkyl ether, aryl ether, aralkyl ether, fatty ester, or aryl ester, the performance of the polyalkylene glycol copolymer (CP) is not affected. An etherified product thereof or esterified product thereof can also be used.

The alkyl group of the alkyl ether may be linear or branched. Examples thereof include alkyl groups having 1 to 22 carbon atoms, such as a methyl group, an ethyl group, a propyl group, a butyl group, an octyl group, a lauryl group, and a stearyl group. Preferred examples of the alkyl ether include methyl ether, ethyl ether, butyl ether, lauryl ether, and stearyl ether of polyalkylene glycol.

The aryl group of the aryl ether is preferably an aryl group having 6 to 22 carbon atoms, more preferably 6 to 12 carbon atoms, even more preferably 6 to 10 carbon atoms. Examples thereof include a phenyl group, a tolyl group, and a naphthyl group. Preferred examples thereof include a phenyl group and a tolyl group. The aralkyl group is preferably an aralkyl group having 7 to 23 carbon atoms, more preferably 7 to 13 carbon atoms, even more preferably 7 to 11 carbon atoms. Examples thereof include a benzyl group and a phenethyl group. A benzyl group is particularly preferred.

The fatty acid of the fatty ester may be linear or branched, and may be a saturated fatty acid or unsaturated fatty acid.

Examples of the fatty acid of the fatty ester include monovalent or divalent fatty acids having 1 to 22 carbon atoms. Examples of monovalent fatty acids include formic acid, acetic acid, propionic acid, butyric acid, valeric acid, caproic acid, enanthic acid, caprylic acid, capric acid, lauric acid, myristic acid, pentadecylic acid, palmitic acid, heptadecylic acid, stearic acid, nonadecanoic acid, arachidic acid, and behenic acid. Examples of monovalent unsaturated fatty acids include unsaturated fatty acids, such as oleic acid, elaidic acid, linoleic acid, linolenic acid, and arachidonic acid. Examples of divalent fatty acids having 10 or more carbon atoms include sebacic acid, undecanedioic acid, dodecanedioic acid, tetradecanedioic acid, thapsic acid, and decenedioic acid, undecenedioic acid, and dodecenedioic acid.

The aryl group of the aryl ester is preferably an aryl group having 6 to 22 carbon atoms, more preferably 6 to 12 carbon atoms, even more preferably 6 to 10 carbon atoms. Examples thereof include a phenyl group, a tolyl group, and a naphthyl group. Preferred examples thereof include a phenyl group and a tolyl group. Even if an end-capping group is an aralkyl group, satisfactory compatibility with the polycarbonate resin (A) is obtained, and the same effect as the aryl group can be provided. The aralkyl group is preferably an aralkyl group having 7 to 23 carbon atoms, more preferably 7 to 13 carbon atoms, even more preferably 7 to 11 carbon atoms. Examples thereof include a benzyl group and a phenethyl group. A benzyl group is particularly preferred.

As the polyalkylene glycol copolymer (CP), a copolymer composed of a tetramethylene ether unit and a 2-methylethylene ether unit, a copolymer composed of a tetramethylene ether unit and a 3-methyltetramethylene ether unit, and a copolymer composed of a tetramethylene ether unit and a 2,2-dimethyltrimethylene ether unit are particularly preferred. Examples of such a commercially available polyalkylene glycol copolymer include trade name "Polycerin DCB", available from NOF Corporation, trade name "PTG-L", available from Hodogaya Chemical Co., Ltd., and trade name "PTXG", available from Asahi Kasei Fibers Corporation.

The copolymer composed of the tetramethylene ether unit and the 2,2-dimethyltrimethylene ether unit can also be produced by a method described in Japanese Unexamined Patent Application Publication No. 2016-125038.

Preferred examples of the polyalkylene glycol compound also include a branched polyalkylene glycol compound represented by general formula (3A) and a linear polyalkylene glycol compound represented by general formula (3B). The branched polyalkylene glycol compound represented by general formula (3A) or the linear polyalkylene glycol compound represented by general formula (3B) may be a copolymer with another copolymerizable component and is preferably a homopolymer.

[Chem. 18]

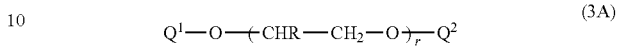

(3A)

In general formula (3A), R is an alkyl group having 1 to 3 carbon atoms. $Q^1$ and $Q^2$ are each independently a hydrogen atom, an aliphatic acyl group having 1 to 23 carbon atoms, or an alkyl group having 1 to 23 carbon atoms. r is an integer of 5 to 400.

[Chem. 19]

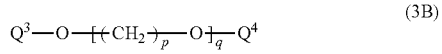

(3B)

In general formula (3B), $Q^3$ and $Q^4$ are each independently a hydrogen atom, an aliphatic acyl group having 2 to 23 carbon atoms, or an alkyl group having 1 to 22 carbon atoms. p is an integer of 2 to 6. q is an integer of 6 to 100.

In general formula (3A), the integer (polymerization degree) r is 5 to 400, preferably 10 to 200, more preferably 15 to 100, particularly preferably 20 to 50. When the polymerization degree r is less than 5, the amount of gas generated during molding is increased, and the gas may cause molding failures, for example, voids, burn marks, and transfer failures. When the polymerization degree r is more than 400, the effect of improving the hue of the pellet of the present invention may not be sufficiently provided.

As the branched polyalkylene glycol compound, preferred are polypropylene glycol (poly(2-methyl)ethylene glycol) in which, in general formula (3A), $Q^1$ and $Q^2$ are each a hydrogen atom and R is a methyl group; and polybutylene glycol (poly(2-ethyl)ethylene glycol) in which $Q^1$ and $Q^2$ are each a hydrogen atom and R is an ethyl group. Polybutylene glycol (poly(2-ethyl)ethylene glycol) is particularly preferred.

In the general formula (3B), the letter q (polymerization degree) is an integer of 6 to 100, preferably 8 to 90, and more preferably 10 to 80. When the polymerization degree q is less than 6, the molding process is disadvantageously accompanied by the generation of gas. When the polymerization degree q exceeds 100, the compatibility is disadvantageously decreased.

Examples of the linear polyalkylene glycol compounds include polyethylene glycol represented by the general formula (3B) in which $Q^3$ and $Q^4$ are hydrogen atoms and p is 2, polytrimethylene glycol in which p is 3, polytetramethylene glycol in which p is 4, polypentamethylene glycol in which p is 5, and polyhexamethylene glycol in which p is 6. Polytrimethylene glycol, polytetramethylene glycol, and esterified compounds and etherified compounds thereof are more preferable.

The performance of the polyalkylene glycol compound is not affected even if an end or both ends of the compound are capped with a fatty acid or an alcohol, and such a fatty acid esterified compound or an etherified compound is usable similarly to the intact compound. Thus, $Q^1$–$Q^4$ in the general formulae (3A) and (3B) may be an aliphatic acyl group or alkyl group having 1 to 23 carbon atoms.

The fatty acid esterified compounds may be linear or branched fatty acid esters. The fatty acids that constitute the fatty acid esters may be saturated fatty acids or unsaturated fatty acids. The fatty acid esterified compounds may be substituted with substituents such as hydroxyl groups in place of part of the hydrogen atoms.

Examples of the fatty acids for constituting the fatty acid esters include monovalent or divalent, fatty acids having 1 to 23 carbon atoms. Specific examples of the monovalent saturated fatty acids include formic acid, acetic acid, propionic acid, butyric acid, valeric acid, caproic acid, enanthic acid, caprylic acid, capric acid, lauric acid, myristic acid, pentadecylic acid, palmitic acid, heptadecylic acid, stearic acid, nonadecanoic acid, arachidic acid and behenic acid. Specific examples of the monovalent unsaturated fatty acids include oleic acid, elaidic acid, linoleic acid, linolenic acid and arachidonic acid. Specific examples of the divalent fatty acids having 10 or more carbon atoms include sebacic acid, undecanedioic acid, dodecanedioic acid, tetradecanedioic acid, thapsic acid, decenedioic acid, undecenedioic acid and dodecenedioic acid.

The fatty acids may be used singly, or two or more may be used in combination. The fatty acids include those fatty acids which have one or more hydroxyl groups in the molecule.

Specific examples of preferred fatty acid esters of branched polyalkylene glycols include polypropylene glycol stearate represented by the general formula (3A) in which R is a methyl group and $Q^1$ and $Q^2$ are aliphatic acyl groups having 18 carbon atoms, and polypropylene glycol behenate in which R is a methyl group and $Q^1$ and $Q^2$ are aliphatic acyl groups having 22 carbon atoms. Specific examples of preferred fatty acid esters of linear polyalkylene glycols include polyalkylene glycol monopalmitate ester, polyalkylene glycol dipalmitate ester, polyalkylene glycol monostearate ester, polyalkylene glycol distearate ester, polyalkylene glycol (monopalmitate•monostearate) ester and polyalkylene glycol behenate.

The alkyl groups that constitute the alkyl ethers of the polyalkylene glycols may be linear or branched. Examples include alkyl groups having 1 to 23 carbon atoms such as methyl group, ethyl group, propyl group, butyl group, octyl group, lauryl group and stearyl group. Some preferred polyalkylene glycol compounds are alkyl methyl ethers, ethyl ethers, butyl ethers, lauryl ethers and stearyl ethers of polyalkylene glycols.

Examples of a commercially available branched polyalkylene glycol compound represented by general formula (3A) include trade name "Uniol D-1000" and "Uniol PB-1000", available from NOF Corporation.

Each of the polyalkylene glycol compounds, such as the polyalkylene glycol copolymer (CP), the branched polyalkylene glycol compound represented by general formula (3A), and the linear polyalkylene glycol compound represented by general formula (3B), preferably has a number-average molecular weight of 200 to 5,000, more preferably 300 or more, more preferably 500 or more, more preferably 4,000 or less, even more preferably 3,000 or less, particularly preferably 2,000 or less, even particularly preferably less than 1,000, most preferably 800 or less. When the number-average molecular weight is more than the upper limit, the compatibility tends to decrease. When the number-average molecular weight is less than the lower limit, a gas tends to be generated during molding. The number average molecular weight of the polyalkylene glycol compound is a number-average molecular weight calculated on the basis of the hydroxyl value measured in accordance with JIS K1577.

These polyalkylene glycol compounds may be used alone or in combination of two or more.

When the pellet of the present invention contains the polyalkylene glycol compound, the polyalkylene glycol compound content varies in accordance with the polyalkylene glycol compound used and is preferably 0.001% to 1.0% by mass, more preferably 0.1% to 0.5% by mass. When the polyalkylene glycol compound content is less than the lower limit or is more than the upper limit, the hue of the resulting molded article tends to be poor.

When the polycarbonate resin composition of the present invention contains the polyalkylene glycol compound, the polyalkylene glycol compound content is preferably 0.001 to 1.0 part by mass, more preferably 0.01 to 0.8 parts by mass, particularly preferably 0.1 to 0.5 parts by mass based on 100 parts by mass of polycarbonate resin (A). When the polyalkylene glycol compound content is less than the lower limit or is more than the upper limit, the hue of the resulting molded article tends to be poor.

<Method for Producing Polycarbonate Resin Composition Pellet>

An example of a method for producing the pellet of the present invention is a method in which components are mixed in one operation or in portions and then the mixture is melt-kneading into a pellet. Here, the amounts of the components mixed are adjusted in such a manner that the amounts of the aromatic compound (B), the phosphorus-based stabilizer (C), and the epoxy compound (D) and/or the oxetane compound, optionally used as needed, in the pellet to be obtained are within the ranges described above or the preferred ranges of the present invention. In other words, In the case of melt-kneading the polycarbonate resin composition, the mixed components, such as the aromatic compound (B), the phosphorus-based stabilizer (C), and the epoxy compound (D) and/or the oxetane compound, may be partially decomposed, depending on the melt-kneading temperature, to decrease the amounts. Thus, the amounts of the components in the pellet to be obtained are not necessarily matched to the amounts of the components mixed for the preparation of the polycarbonate resin composition. Accordingly, in the present invention, the components are mixed in such a manner that the amounts of the aromatic compound (B), the phosphorus-based stabilizer (C), and the epoxy compound (D) and/or oxetane compound contained in the pellet to be obtained are the amounts described above. Alternatively, the polycarbonate resin composition of the present invention is prepared, and then the amount mixed and the melt-kneading temperature are controlled in such a manner that the amount of the aromatic compound (B) contained in the pellet to be obtained is the amount described above.

Examples of a method for mixing the components together include a method using a tumbler mixer, a Henschel mixer, or the like; and a method in which the components are quantitatively supplied from feeders to an extruder hopper.

The melt-kneading is preferably performed with, for example, a single-screw kneading extruder or a twin-screw kneading extruder. A strand of the aromatic polycarbonate resin composition extruded from a discharge nozzle at the tip of an extruder is pulled with a pinch roller, conveyed through a water tank for cooling, and cut into a predetermined size with a pelletizer to obtain pellets composed of the aromatic polycarbonate resin composition.

The melt-kneading temperature is preferably in the range of 240° C. to 320° C., particularly 250° C. to 300° C. in such a manner that the amount of the aromatic compound (B) in a pellet to be obtained is within the range.

[Molded Article]

A molded article of the present invention is obtained by molding the pellets of the present invention.

Examples of a method for molding the pellets of the present invention include, but are not particularly limited to, an injection molding method, a compression molding method, and an injection compression molding. The injection molding method is preferred.

To suppress the thermal degradation of the resin during molding and achieve excellent hue, the pellets of the present invention are preferably molded in an atmosphere of an inert gas such as nitrogen.

The molded article obtained by molding the pellets of the present invention has a remarkably good hue as compared with conventional molded articles and thus can be suitably used as a light guide member for a lighting device, in particular, a light guide member for an automotive lighting device exposed to heat generated from an incandescent lamp as well as heat generated from a light source of a daytime running light. Owing to its excellent hue, the light transmission efficiency of the light guide member can be maintained at a high level over a long period of time, and the frequency of replacement of the light guide member can be significantly reduced.

[YI Value]

The pellets of the present invention are extremely excellent in hue. The YI value at a length of 300 mm measured for a molded article having an optical path length of 300 mm obtained by injection molding of the pellets of the present invention in conformity with a method described in Examples below is usually about 16 or less, preferably 15 or less, more preferably 14 or less. Thus, the molded article exhibits a much better hue than known molded articles.

EXAMPLES

While the present invention will be described in more detail below with reference to examples, the present invention is not limited to these examples described below so long as the present invention does not depart from the scope of the invention.

[Raw Materials]

In Examples and Comparative examples, the following raw materials were used.

[Polycarbonate Resin (A)]

A1: "Iupilon (registered trademark) H-4000F", available from Mitsubishi Engineering-Plastics Corporation: bisphenol A aromatic polycarbonate resin (viscosity-average molecular weight: 15,000) produced by an interfacial polymerization method

[Aromatic Compound (B) Represented by General Formula (1)]

<Aromatic Compound (B) where Y is Hydrogen Atom>

B11: "Benzyl Alcohol S", available from Tokyo Ohka Kogyo Co., Ltd.: benzyl alcohol B12: "Biphenylmethanol", available from Mitsubishi Gas Chemical Co., Inc.: 4-phenylbenzyl alcohol B13: 2-methylphenylmethanol, available from Tokyo Chemical Industry Co., Ltd.

B14: 4-methylphenylmethanol, available from Tokyo Chemical Industry Co., Ltd.

B15: 4-tert-butylphenylmethanol, available from Tokyo Chemical Industry Co., Ltd.

B16: 1,4-benzenedimethanol, available from Tokyo Chemical Industry Co., Ltd.

<Aromatic Compound (B) Where Y Is Organic Group>

B21: "dibenzyl ether ($C_6H_5CH_2$—O—$CH_2C_6H_5$)", available from Daiwa Fine Chemicals Co., Ltd.

B22: "benzyl methyl ether ($C_6H_5CH_2$—O—$CH_3$)", available from Tokyo Chemical Industry Co., Ltd.

B23: "2-benzyloxyethanol ($C_6H_5CH_2$—O—$CH_2CH_2OH$)", available from Tokyo Chemical Industry Co., Ltd.

B24: "allyl benzyl ether ($C_6H_5$—$CH_2$—O—$CH_2$—$CH=CH_2$)", available from Tokyo Chemical Industry Co., Ltd.

B25: "benzyl acetate ($C_6H_5$—$CH_2$—O—$C(=O)$—$CH_3$)", available from Tokyo Chemical Industry Co., Ltd.

B26: "benzyl benzoate ($C_6H_5$—$CH_2$—O—$C(=O)$—$C_6H_5$)", available from Tokyo Chemical Industry Co., Ltd.

B27: "benzyl butyrate ($C_6H_5$—$CH_2$—O—$C(=O)$—$C_3H_7$)", available from Tokyo Chemical Industry Co., Ltd.

B28: "1,4-bis(methoxymethyl)benzene ($CH_3$—O—$CH_2$—$C_6H_4$—$CH_2$—O—$CH_3$)", available from Tokyo Chemical Industry Co., Ltd.

[Aromatic Compound (b) for Comparison]

b1: 2-methoxyphenylmethanol, available from Tokyo Chemical Industry Co., Ltd.

b2: 4-methoxyphenylmethanol, available from Tokyo Chemical Industry Co., Ltd.

b3: 2,3-dimethoxyphenylmethanol, available from Tokyo Chemical Industry Co., Ltd.

b4: 3,4,5-trimethoxyphenylmethanol, available from Tokyo Chemical Industry Co., Ltd.

b5: 3-phenoxyphenylmethanol, available from Tokyo Chemical Industry Co., Ltd.

b6: α-methylphenylmethanol, available from Tokyo Chemical Industry Co., Ltd.

b7: α,α-dimethylphenylmethanol, available from Tokyo Chemical Industry Co., Ltd.

[Phosphorus-Based Stabilizer (C)]

<Phosphite-Based Stabilizer (C-I)>

C1: "Doverphos S-9228", available from Properties & Characteristics: bis(2,4-dicumylphenyl)pentaerythritol diphosphite C3: "ADK STAB PEP-36", available from Adeka Corporation: bis(2,6-di-tert-butyl-4-methylphenyl)pentaerythritol diphosphite <Phosphite-Based Stabilizer (C-II)>

C2: "ADK STAB AS2112", available from Adeka Corporation: tris(2,4-di-tert-butylphenyl)phosphite

[Epoxy Compound (D)]

D1: "Celloxide 2021P", available from Daicel Corporation: 3,4-epoxycyclohexylmethyl-3',4'-epoxycyclohexylcarboxylate

[Oxetane Compound (E)]

E1: "Arone Oxetane OXT-221", available from Toagosei Co., Ltd.: 3-ethyl-3{[(3-ethyloxetan-3-yl)methoxy]methyl}oxetane

[Polyalkylene Glycol (X)]

X1: "PEG #1000", available from Wako Pure Chemical Industries, Ltd.: polyethylene glycol (number-average molecular weight: 600)

X2: "Uniol D-2000", available from NOF corporation: polypropylene glycol (number-average molecular weight: 2,000)

X3: "Uniol PB-700", available from NOF corporation: polybutylene glycol (number-average molecular weight: 700)

[Analysis and Evaluation Method]

Methods for analyzing and evaluating pellets produced in Examples and Comparative examples are described below.

[Analysis of Amount of Component in Pellet]

The amounts of the aromatic compound (B), the aromatic alcohol (b), the phosphorus-based stabilizer (C), the epoxy compound (D), and the oxetane compound (E) contained in the pellet were determined by gas chromatography (GC) measurement described below.

The amount of the polyalkylene glycol (X) contained in the pellet was determined by nuclear magnetic resonance (NMR) measurement described below.

<GC Measurement>

A solution of the pellet in dichloromethane was prepared. Acetone was added dropwise to the solution to reprecipitate the polymer component. The mixture was filtered. The filtrate was concentrated and then dissolved in 5 ml of dichloromethane. The resulting dichloromethane solution was analyzed with a gas chromatograph ("GC-2010", available from Shimadzu Corporation) equipped with a capillary column (UA-1). The inlet temperature of the gas chromatograph was 275° C. The detector temperature was 350° C. The column temperature was raised from 50° C. to 350° C. The final temperature was maintained for 5 minutes. The amounts contained in the pellet were calculated from the measurement results using a calibration curve prepared from separately prepared standard substances.

<NMR Measurement>

The pellet was dissolved in deuterated tetrachloroethane, sealed in a special sample tube, and subjected to $^1$H NMR spectrum measurement with a nuclear magnetic resonance spectrometer ("AVANCE III 500", available from Bruker Corporation). The amount contained in the pellet was calculated based on the integral ratio.

[Evaluation of Hue (YI)]

The pellets were dried in a hot-air circulation dryer at 120° C. for 4 to 8 hours and molded with an injection molding machine ("EC100", available from Toshiba Machine Co., Ltd.) at a temperature of 280° C. to produce a molded article having an optical path length of 300 mm (6 mm×4 mm×300 mm, L/d=50).

The YI value at a length of 300 mm of the molded article was measured with a long path-length transmission spectrophotometer ("ASA 1", available from Nippon Denshoku Industries Co., Ltd).

[Examples and Comparative Examples in which Aromatic Compound (B) where Y is Hydrogen Atom is Used]

Examples I-1 to 37 and Comparative Examples I-1 to 14

The polycarbonate resin (A) and components presented in Tables 1A, 1B, and 2 to 5 were uniformly mixed together in predetermined proportions with a tumbler mixer to obtain mixtures. Each of the mixtures was supplied to a single-screw extruder equipped with a full flight screw and a vent ("VS-40", available from Isuzu Kakouki K.K.), kneaded at a screw rotation speed of 80 rpm, a discharge rate of 20 kg/h, and a barrel temperature of 250° C., and extruded in a strand form from the tip of the extrusion nozzle. The extruded product was rapidly cooled in a water tank and cut with a pelletizer into pellets. Thereby, polycarbonate resin composition pellets were produced.

Tables 1A, 1B, and 2 to 5 present the analysis and evaluation results of the resulting pellets.

TABLE 1A

|  |  |  | Example | | | | | | |
|---|---|---|---|---|---|---|---|---|---|
| Component | | Code | I-1 | I-2 | I-3 | I-4 | I-5 | I-6 | I-7 |
| Amount in pellet (% by mass) | Aromatic compound (B) | B11 | 0.05 | 0.21 | 0.18 | 0.54 | | | |
|  |  | B12 | | | | | 0.07 | 0.37 | 0.44 |
|  | Polyalkylene glycol (X) | X1 | | | | | | | |
|  |  | X2 | | | | | | | |
|  |  | X3 | | | | | | | |
|  | Phosphorus-based stabilizer (C) | C1 | 0.04 | 0.04 | 0.04 | 0.04 | 0.04 | 0.04 | 0.04 |
|  |  | C2 | 0.09 | 0.09 | 0.09 | 0.09 | 0.09 | 0.09 | 0.09 |
|  | Epoxy compound (D) | D1 | | | | 0.04 | | | 0.04 |
|  | Oxetane compound (E) | E1 | | | | | | | |
| Hue (YI) (300 mm) | | | 15.01 | 12.45 | 11.40 | 10.50 | 14.61 | 12.11 | 11.87 |

|  |  |  | Example | | | | | |
|---|---|---|---|---|---|---|---|---|
| Component | | Code | I-8 | I-9 | I-34 | I-35 | I-36 | I-37 |
| Amount in pellet (% by mass) | Aromatic compound (B) | B11 | | 0.11 | 0.21 | 0.20 | | |
|  |  | B12 | 0.72 | 0.18 | | | 0.42 | 0.43 |
|  | Polyalkylene glycol (X) | X1 | | | | | | |
|  |  | X2 | | | | | | |
|  |  | X3 | | | | | | |
|  | Phosphorus-based stabilizer (C) | C1 | 0.04 | 0.04 | 0.04 | 0.04 | 0.04 | 0.04 |
|  |  | C2 | 0.09 | 0.09 | 0.09 | 0.09 | 0.09 | 0.09 |
|  | Epoxy compound (D) | D1 | | | | 0.02 | | 0.02 |
|  | Oxetane compound (E) | E1 | | | 0.03 | 0.015 | 0.03 | 0.015 |
| Hue (YI) (300 mm) | | | 10.40 | 12.38 | 11.38 | 11.40 | 11.85 | 11.87 |

TABLE 1B

|  |  |  | Comparative example | | | | | |
| --- | --- | --- | --- | --- | --- | --- | --- | --- |
|  | Component | Code | I-1 | I-2 | I-3 | I-4 | I-5 | I-14 |
| Amount in pellet (% by mass) | Aromatic compound (B) | B11 |  |  |  |  |  |  |
|  |  | B12 |  |  |  |  |  |  |
|  | Polyalkylene glycol (X) | X1 |  | 0.44 |  |  |  |  |
|  |  | X2 |  |  | 0.42 |  |  | 0.43 |
|  |  | X3 |  |  |  | 0.48 | 0.46 |  |
|  | Phosphorus-based stabilizer (C) | C1 | 0.04 | 0.04 | 0.04 | 0.04 | 0.04 | 0.04 |
|  |  | C2 | 0.09 | 0.09 | 0.09 | 0.09 | 0.09 | 0.09 |
|  | Epoxy compound (D) | D1 |  |  |  |  | 0.04 | 0.04 |
|  | Oxetane compound (E) | E1 |  |  |  |  |  |  |
| Hue (YI) (300 mm) |  |  | 17.03 | 12.11 | 13.54 | 14.14 | 13.91 | 13.32 |

TABLE 2

|  |  |  | Example | | | | | | | | | |
| --- | --- | --- | --- | --- | --- | --- | --- | --- | --- | --- | --- | --- |
|  | Component | Code | I-10 | I-11 | I-12 | I-13 | I-14 | I-15 | I-16 | I-17 | I-18 | I-19 |
| Amount in pellet (% by mass) | Aromatic compound (B) | B11 |  |  |  | 0.11 | 0.11 | 0.11 |  |  |  | 0.11 |
|  |  | B12 |  |  |  |  |  |  | 0.18 | 0.18 |  | 0.10 |
|  |  | B13 | 0.25 |  |  | 0.12 |  |  | 0.12 |  | 0.13 | 0.06 |
|  |  | B14 |  | 0.25 |  |  | 0.12 |  |  | 0.12 | 0.12 |  |
|  |  | B15 |  |  | 0.45 |  |  | 0.22 |  |  |  |  |
|  | Aromatic compound (b) | b1 |  |  |  |  |  |  |  |  |  |  |
|  |  | b2 |  |  |  |  |  |  |  |  |  |  |
|  |  | b3 |  |  |  |  |  |  |  |  |  |  |
|  |  | b4 |  |  |  |  |  |  |  |  |  |  |
|  |  | b5 |  |  |  |  |  |  |  |  |  |  |
|  |  | b6 |  |  |  |  |  |  |  |  |  |  |
|  |  | b7 |  |  |  |  |  |  |  |  |  |  |
|  | Phosphorus-based stabilizer (C) | C1 | 0.04 | 0.04 | 0.04 | 0.04 | 0.04 | 0.04 | 0.04 | 0.04 | 0.04 | 0.04 |
|  |  | C2 | 0.09 | 0.09 | 0.09 | 0.09 | 0.09 | 0.09 | 0.09 | 0.09 | 0.09 | 0.09 |
| Hue (YI) (300 mm) |  |  | 14.28 | 14.81 | 13.04 | 13.66 | 13.87 | 12.89 | 13.44 | 13.77 | 14.71 | 13.15 |

|  |  |  | Comparative example | | | | | | |
| --- | --- | --- | --- | --- | --- | --- | --- | --- | --- |
|  | Component | Code | I-6 | I-7 | I-8 | I-9 | I-10 | I-11 | I-12 |
| Amount in pellet (% by mass) | Aromatic compound (B) | B11 |  |  |  |  |  |  |  |
|  |  | B12 |  |  |  |  |  |  |  |
|  |  | B13 |  |  |  |  |  |  |  |
|  |  | B14 |  |  |  |  |  |  |  |
|  |  | B15 |  |  |  |  |  |  |  |
|  | Aromatic compound (b) | b1 | 0.30 |  |  |  |  |  |  |
|  |  | b2 |  | 0.30 |  |  |  |  |  |
|  |  | b3 |  |  | 0.35 |  |  |  |  |
|  |  | b4 |  |  |  | 0.45 |  |  |  |
|  |  | b5 |  |  |  |  | 0.48 |  |  |
|  |  | b6 |  |  |  |  |  | 0.40 |  |
|  |  | b7 |  |  |  |  |  |  | 0.42 |
|  | Phosphorus-based stabilizer (C) | C1 | 0.04 | 0.04 | 0.04 | 0.04 | 0.04 | 0.04 | 0.04 |
|  |  | C2 | 0.09 | 0.09 | 0.09 | 0.09 | 0.09 | 0.09 | 0.09 |
| Hue (YI) (300 mm) |  |  | 18.21 | 23.04 | 25.68 | 18.17 | 21.56 | 22.72 | 30.06 |

TABLE 3

| | Component | Code | \multicolumn{6}{c|}{Example} | Comparative example |
| | | | I-20 | I-21 | I-22 | I-23 | I-24 | I-25 | I-13 |
|---|---|---|---|---|---|---|---|---|---|
| Amount in pellet (% by mass) | Aromatic compound (B) | B11<br>B12 | 0.22 | 0.26 | 0.24 | 0.23 | 0.25 | 0.25 | |
| | Phosphorus-based stabilizer (C) | C3<br>C2 | 0.03<br>0.09 | 0.03<br>0.09 | 0.004<br>0.09 | 0.004<br>0.09 | 0.38<br>0.09 | 0.38<br>0.09 | 0.03<br>0.09 |
| | Epoxy compound (D) | D1 | | 0.04 | | 0.04 | | 0.04 | |
| Hue (YI) (300 mm) | | | 15.22 | 14.78 | 16.68 | 15.14 | 17.43 | 17.10 | 17.85 |

TABLE 4

| | Component | Code | I-26 | I-27 | I-28 | I-29 | I-30 | I-31 |
|---|---|---|---|---|---|---|---|---|
| Amount in pellet (% by mass) | Aromatic compound (B) | B11<br>B12 | 0.23 | 0.25 | 0.24 | 0.23 | 0.25 | 0.24 |
| | Polyalkylene glycol (X) | X1<br>X2<br>X3 | 0.09 | 0.08 | 0.08 | 0.08 | 0.08 | 0.08 |
| | Phosphorus-based stabilizer (C) | C1<br>C2 | 0.04<br>0.09 | 0.04<br>0.09 | 0.04<br>0.09 | 0.04<br>0.09 | 0.04<br>0.09 | 0.04<br>0.09 |
| | Epoxy compound (D) | D1 | | | | 0.03 | 0.04 | 0.03 |
| Hue (YI) (300 mm) | | | 12.71 | 13.04 | 13.50 | 12.23 | 12.87 | 13.20 |

TABLE 5

| | Component | Code | I-32 | I-33 |
|---|---|---|---|---|
| Amount in pellet (% by mass) | Aromatic compound (B) | B16 | 0.47 | 0.47 |
| | Phosphorus-based stabilizer (C) | C1<br>C2 | 0.04<br>0.09 | 0.04<br>0.09 |
| | Epoxy compound (D) | D1 | | 0.04 |
| Hue (YI) (300 mm) | | | 15.90 | 13.20 |

Tables 1A, 1B, and 2 reveal the following.

In Comparative example I-1, in which the phosphorus-based stabilizer (C) is contained and the aromatic compound (B) is not contained, the hue (YI) is poor.

In comparative examples I-2 to 5, in which the polyalkylene glycol (X) is used in place of the aromatic compound (B), the hue is improved as compared with Comparative example I-1, but inferior to those in Examples.

In Comparative examples I-6 to 10, in which the aromatic compounds (b1) to (b5), which are similar aromatic compounds, each containing, as a substituent on the benzene ring, an alkoxy group or a phenoxy group instead of an alkyl group or aryl group are used, and in Comparative examples I-11 and 12, in which the aromatic compounds (b6) and (b7) each containing a hydroxymethyl group whose hydrogen atom is replaced with an alkyl group is used, the effect of improving the hue is not provided, and the hue is inferior to that in Comparative example I-1, in which the aromatic compound (B) is not incorporated.

In contrast, the pellets containing the aromatic compound (B) represented by general formula (1) and the phosphorus-based stabilizer (C) in each of Examples I-1 to 19 are extremely excellent in hue (YI). Further incorporation of the epoxy compound (D) results in a further improvement in hue.

In each of Examples I-34 and 36, the oxetane compound (E) is used in place of the epoxy compound (D). In each of Examples I-35 and 37, the epoxy compound (D) and the oxetane compound (E) are used in combination. Similar to the case of using the epoxy compound (D), the effect of improving the hue is provided.

Comparisons between Examples I-2, 4, 6, and 9 and Comparative examples I-2 to 4 and between Examples I-3 and 7 and Comparative examples I-5 and 14 reveal that the aromatic compound (B) can provide the effect of improving the hue in a smaller amount contained than the polyalkylene glycol (X).

The same thing is clear from comparisons between Examples I-20 to 25 and Comparative example I-13 in Table 3. That is, in Examples I-20 to 25, in which both of the phosphorus-based stabilizer (C) and the aromatic compound (B) are contained, the hue (YI) is clearly improved, compared with Comparative example I-13, in which the aromatic compound (B) is not contained. Comparisons between Example I-20 and Example I-21, between Example I-22 and Example I-23, and between Example I-24 and Example I-25 reveal that further incorporation of the epoxy compound (D) results in a further improvement in hue.

In Examples I-26 to 31 in Table 4, the polyalkylene glycol (X) is contained together with the aromatic compound (B) and the phosphorus-based stabilizer (C). Even in these combination systems, the effect of improving the hue can be provided at a smaller amount contained.

In Examples I-32 and 33 in Table 5, the benzenedimethanol-based compound is used as the aromatic compound (B) instead of the benzyl alcohol-based compound.

Although slightly inferior to the case of using the benzyl alcohol-based compound, the effect of improving the hue is provided.

Examples II-1 to 37 and Comparative Examples II-1 to 14

Components presented in Tables 6A, 6B, and 7 to 10 were uniformly mixed together in proportions presented in Tables 6A, 6B, and 7 to 10 with a tumbler mixer to obtain mixtures. Each of the mixtures was supplied to a single-screw extruder equipped with a full flight screw and a vent ("VS-40", available from Isuzu Kakouki K.K.), kneaded at a screw rotation speed of 80 rpm, a discharge rate of 20 kg/h, and a barrel temperature of 250° C., and extruded in a strand form from the tip of the extrusion nozzle. The extruded product was rapidly cooled in a water tank and cut with a pelletizer into pellets. Thereby, polycarbonate resin composition pellets were produced.

Tables 6A, 6B, and 7 to 10 present the analysis and evaluation results of the resulting pellets.

TABLE 6A

| | Component | Code | Example II-1 | II-2 | II-3 | II-4 | II-5 | II-6 | II-7 |
|---|---|---|---|---|---|---|---|---|---|
| Formulation of polycarbonate resin composition (parts by mass) | Polycarbonate resin (A) | A1 | 100 | 100 | 100 | 100 | 100 | 100 | 100 |
| | Aromatic compound (B) | B11 | 0.10 | 0.50 | 0.50 | 1.00 | | | |
| | | B12 | | | | | 0.10 | 0.50 | 0.50 |
| | Polyalkylene glycol (X) | X1 | | | | | | | |
| | | X2 | | | | | | | |
| | | X3 | | | | | | | |
| | Phosphorus-based stabilizer (C) | C1 | 0.05 | 0.05 | 0.05 | 0.05 | 0.05 | 0.05 | 0.05 |
| | | C2 | 0.10 | 0.10 | 0.10 | 0.10 | 0.10 | 0.10 | 0.10 |
| | Epoxy compound (D) | D1 | | | 0.05 | | | | 0.05 |
| | Oxetane compound (E) | E1 | | | | | | | |
| Amount of aromatic compound (B) or polyalkylene glycol (X) in pellet (% by mass) | | | 0.05 | 0.21 | 0.18 | 0.54 | 0.07 | 0.37 | 0.44 |
| Hue (YI) (300 mm) | | | 15.01 | 12.45 | 11.40 | 10.50 | 14.61 | 12.11 | 11.87 |

| | Component | Code | Example II-8 | II-9 | II-34 | II-35 | II-36 | II-37 |
|---|---|---|---|---|---|---|---|---|
| Formulation of polycarbonate resin composition (parts by mass) | Polycarbonate resin (A) | A1 | 100 | 100 | 100 | 100 | 100 | 100 |
| | Aromatic compound (B) | B11 | | 0.25 | 0.50 | 0.50 | | |
| | | B12 | 1.00 | 0.25 | | | 0.50 | 0.50 |
| | Polyalkylene glycol (X) | X1 | | | | | | |
| | | X2 | | | | | | |
| | | X3 | | | | | | |
| | Phosphorus-based stabilizer (C) | C1 | 0.05 | 0.05 | 0.05 | 0.05 | 0.05 | 0.05 |
| | | C2 | 0.10 | 0.10 | 0.10 | 0.10 | 0.10 | 0.10 |
| | Epoxy compound (D) | D1 | | | | 0.03 | | 0.03 |
| | Oxetane compound (E) | E1 | | | 0.04 | 0.02 | 0.04 | 0.02 |
| Amount of aromatic compound (B) or polyalkylene glycol (X) in pellet (% by mass) | | | 0.72 | 0.29 | 0.21 | 0.20 | 0.42 | 0.43 |
| Hue (YI) (300 mm) | | | 10.40 | 12.38 | 11.38 | 11.40 | 11.85 | 11.87 |

TABLE 6B

| | Component | Code | Comparative example II-1 | II-2 | II-3 | II-4 | II-5 | II-14 |
|---|---|---|---|---|---|---|---|---|
| Formulation of polycarbonate resin composition (parts by mass) | Polycarbonate resin (A) | A1 | 100 | 100 | 100 | 100 | 100 | 100 |
| | Aromatic compound (B) | B11 | | | | | | |
| | | B12 | | | | | | |
| | Polyalkylene glycol (X) | X1 | | 0.50 | | | | |
| | | X2 | | | 0.50 | | | 0.50 |
| | | X3 | | | | 0.50 | 0.50 | |
| | Phosphorus-based stabilizer (C) | C1 | 0.05 | 0.05 | 0.05 | 0.05 | 0.05 | 0.05 |
| | | C2 | 0.10 | 0.10 | 0.10 | 0.10 | 0.10 | 0.10 |

TABLE 6B-continued

|  |  | Comparative example | | | | | |
|---|---|---|---|---|---|---|---|
| Component | Code | II-1 | II-2 | II-3 | II-4 | II-5 | II-14 |
| Epoxy compound (D) | D1 |  |  |  |  | 0.05 | 0.05 |
| Oxetane compound (E) | E1 |  |  |  |  |  |  |
| Amount of aromatic compound (B) or polyalkylene glycol (X) in pellet (% by mass) |  |  | 0.44 | 0.42 | 0.48 | 0.46 | 0.43 |
| Hue (YI) (300 mm) |  | 17.03 | 12.11 | 13.54 | 14.14 | 13.91 | 13.32 |

TABLE 7

|  |  |  | Example | | | | | | | |
|---|---|---|---|---|---|---|---|---|---|---|
| Component |  | Code | II-10 | II-11 | II-12 | II-13 | II-14 | II-15 | II-16 | II-17 |
| Formulation of polycarbonate resin composition (parts by mass) | Polycarbonate resin (A) | A1 | 100 | 100 | 100 | 100 | 100 | 100 | 100 | 100 |
|  | Aromatic compound (B) | B11 |  |  |  | 0.25 | 0.25 | 0.25 |  |  |
|  |  | B12 |  |  |  |  |  |  | 0.25 | 0.25 |
|  |  | B13 | 0.50 |  |  | 0.25 |  |  | 0.25 |  |
|  |  | B14 |  | 0.50 |  |  | 0.25 |  |  | 0.25 |
|  |  | B15 |  |  | 0.50 |  |  | 0.25 |  |  |
|  | Aromatic compound (b) | b1 |  |  |  |  |  |  |  |  |
|  |  | b2 |  |  |  |  |  |  |  |  |
|  |  | b3 |  |  |  |  |  |  |  |  |
|  |  | b4 |  |  |  |  |  |  |  |  |
|  |  | b5 |  |  |  |  |  |  |  |  |
|  |  | b6 |  |  |  |  |  |  |  |  |
|  |  | b7 |  |  |  |  |  |  |  |  |
|  | Phosphorus-based stabilizer (C) | C1 | 0.05 | 0.05 | 0.05 | 0.05 | 0.05 | 0.05 | 0.05 | 0.05 |
|  |  | C2 | 0.10 | 0.10 | 0.10 | 0.10 | 0.10 | 0.10 | 0.10 | 0.10 |
| Amount of aromatic compound (B) or aromatic compound (b) in pellet (% by mass) |  |  | 0.25 | 0.25 | 0.45 | 0.23 | 0.23 | 0.33 | 0.30 | 0.30 |
| Hue (YI) (300 mm) |  |  | 14.28 | 14.81 | 13.04 | 13.66 | 13.87 | 12.89 | 13.44 | 13.77 |

|  |  |  | Example | | Comparative example | | | | | | |
|---|---|---|---|---|---|---|---|---|---|---|---|
| Component |  | Code | II-18 | II-19 | II-6 | II-7 | II-8 | II-9 | II-10 | II-11 | II-12 |
| Formulation of polycarbonate resin composition (parts by mass) | Polycarbonate resin (A) | A1 | 100 | 100 | 100 | 100 | 100 | 100 | 100 | 100 | 100 |
|  | Aromatic compound (B) | B11 |  | 0.25 |  |  |  |  |  |  |  |
|  |  | B12 |  | 0.125 |  |  |  |  |  |  |  |
|  |  | B13 | 0.25 | 0.125 |  |  |  |  |  |  |  |
|  |  | B14 | 0.25 |  |  |  |  |  |  |  |  |
|  |  | B15 |  |  |  |  |  |  |  |  |  |
|  | Aromatic compound (b) | b1 |  |  | 0.50 |  |  |  |  |  |  |
|  |  | b2 |  |  |  | 0.50 |  |  |  |  |  |
|  |  | b3 |  |  |  |  | 0.50 |  |  |  |  |
|  |  | b4 |  |  |  |  |  | 0.50 |  |  |  |
|  |  | b5 |  |  |  |  |  |  | 0.50 |  |  |
|  |  | b6 |  |  |  |  |  |  |  | 0.50 |  |
|  |  | b7 |  |  |  |  |  |  |  |  | 0.50 |
|  | Phosphorus-based stabilizer (C) | C1 | 0.05 | 0.05 | 0.05 | 0.05 | 0.05 | 0.05 | 0.05 | 0.05 | 0.05 |
|  |  | C2 | 0.10 | 0.10 | 0.10 | 0.10 | 0.10 | 0.10 | 0.10 | 0.10 | 0.10 |
| Amount of aromatic compound (B) or aromatic compound (b) in pellet (% by mass) |  |  | 0.25 | 0.27 | 0.30 | 0.30 | 0.35 | 0.45 | 0.48 | 0.40 | 0.42 |
| Hue (YI) (300 mm) |  |  | 14.71 | 13.15 | 18.21 | 23.04 | 25.68 | 18.17 | 21.56 | 22.72 | 30.06 |

TABLE 8

| | Component | Code | Example II-20 | II-21 | II-22 | II-23 | II-24 | II-25 | Comparative example II-13 |
|---|---|---|---|---|---|---|---|---|---|
| Formulation of polycarbonate resin composition (parts by mass) | Polycarbonate resin (A) | A1 | 100 | 100 | 100 | 100 | 100 | 100 | 100 |
| | Aromatic compound (B) | B11 B12 | 0.30 | 0.30 | 0.30 | 0.30 | 0.30 | 0.30 | |
| | Phosphorus-based stabilizer (C) | C3 | 0.05 | 0.05 | 0.005 | 0.005 | 0.50 | 0.50 | 0.05 |
| | | C2 | 0.10 | 0.10 | 0.10 | 0.10 | 0.10 | 0.10 | 0.10 |
| | Epoxy compound (D) | D1 | | 0.05 | | 0.05 | | 0.05 | |
| Amount of aromatic compound (B) in pellet (% by mass) | | | 0.22 | 0.26 | 0.24 | 0.23 | 0.25 | 0.25 | |
| Hue (YI) (300 mm) | | | 15.22 | 14.78 | 16.68 | 15.14 | 17.43 | 17.10 | 17.85 |

TABLE 9

| | Component | Code | Example II-26 | II-27 | II-28 | II-29 | II-30 | II-31 |
|---|---|---|---|---|---|---|---|---|
| Formulation of polycarbonate resin composition (parts by mass) | Polycarbonate resin (A) | A1 | 100 | 100 | 100 | 100 | 100 | 100 |
| | Aromatic compound (B) | B11 B12 | 0.30 | 0.30 | 0.30 | 0.30 | 0.30 | 0.30 |
| | Polyalkylene glycol (X) | X1 | 0.10 | | | 0.10 | | |
| | | X2 | | 0.10 | | | 0.10 | |
| | | X3 | | | 0.10 | | | 0.10 |
| | Phosphorus-based stabilizer (C) | C1 | 0.05 | 0.05 | 0.05 | 0.05 | 0.05 | 0.05 |
| | | C2 | 0.10 | 0.10 | 0.10 | 0.10 | 0.10 | 0.10 |
| | Epoxy compound (D) | D1 | | | | 0.05 | 0.05 | 0.05 |
| Amount of aromatic compound (B) in pellet (% by mass) | | | 0.23 | 0.35 | 0.24 | 0.23 | 0.25 | 0.24 |
| Amount of polyalkylene glycol (X) in pellet (% by mass) | | | 0.09 | 0.08 | 0.08 | 0.08 | 0.08 | 0.08 |
| Hue (YI) (300 mm) | | | 12.71 | 13.04 | 13.50 | 12.23 | 12.87 | 13.20 |

TABLE 10

| | Component | Code | Example II-32 | II-33 |
|---|---|---|---|---|
| Formulation of polycarbonate resin composition (parts by mass) | Polycarbonate resin (A) | A1 | 100 | 100 |
| | Aromatic compound (B) | B16 | 0.50 | 0.50 |
| | Phosphorus-based stabilizer (C) | C1 | 0.05 | 0.05 |
| | | C2 | 0.1 | 0.1 |
| | Epoxy compound (D) | D1 | | 0.05 |
| Amount of aromatic compound (B) in pellet (% by mass) | | | 0.47 | 0.47 |
| Hue (YI) (300 mm) | | | 15.90 | 13.20 |

Tables 6A, 6B, and 7 reveal the following.

In Comparative example II-1, in which the phosphorus-based stabilizer (C) is incorporated and the aromatic compound (B) is not incorporated, the hue (YI) is poor.

In comparative examples II-2 to 5, in which the polyalkylene glycol (X) is incorporated in place of the aromatic compound (B), the hue is improved as compared with Comparative example II-1, but inferior to those in Examples.

In Comparative examples II-6 to 10, in which the aromatic compounds (b1) to (b5), which are similar aromatic compounds, each containing, as a substituent on the benzene ring, an alkoxy group or a phenoxy group instead of an alkyl group or aryl group are used, and in Comparative examples II-11 and 12, in which the aromatic compounds (b6) and (b7) each containing a hydroxymethyl group whose hydrogen atom is replaced with an alkyl group is used, the effect of improving the hue is not provided, and the hue is inferior to that in Comparative example II-1, in which the aromatic alcohol is not incorporated.

In contrast, in the case of the pellets in each of Examples II-1 to 19, in which the aromatic compound (B) represented by general formula (1) and the phosphorus-based stabilizer (C) are incorporated and the aromatic compound (B) is contained in each pellet in a predetermined proportion, the pellets are extremely excellent in hue (YI). Further incorporation of the epoxy compound (D) results in a further improvement in hue.

In each of Examples II-34 and 36, the oxetane compound (E) is used in place of the epoxy compound (D). In each of Examples II-35 and 37, the epoxy compound (D) and the oxetane compound (E) are used in combination. Similar to the case of using the epoxy compound (D), the effect of improving the hue is provided.

Comparisons between Examples II-2, 4, 6, and 9 and Comparative examples II-2 to 4 and between Examples II-3 and 7 and Comparative examples II-5 and 14 reveal that the aromatic compound (B) can provide the effect of improving the hue in a smaller amount incorporated than the polyalkylene glycol (X).

The same thing is clear from comparisons between Examples II-20 to 25 and Comparative example II-13 in Table 8. That is, in Examples II-20 to 25, in which both of the phosphorus-based stabilizer (C) and the aromatic compound (B) are contained, the hue (YI) is clearly improved, compared with Comparative example II-13, in which the aromatic compound (B) is not contained. Comparisons between Example II-20 and Example II-21, between Example II-22 and Example II-23, and between Example II-24 and Example II-25 reveal that further incorporation of the epoxy compound (D) results in a further improvement in hue.

In Examples II-26 to 31 in Table 9, the polyalkylene glycol (X) is incorporated together with the aromatic compound (B) and the phosphorus-based stabilizer (C). Even in these combination systems, the effect of improving the hue can be provided at a smaller amount incorporated.

In Examples II-32 and 33 in Table 10, the benzenedimethanol-based compound is used as the aromatic compound (B) instead of the benzyl alcohol-based compound. Although slightly inferior to the case of using the benzyl alcohol-based compound, the effect of improving the hue is provided.

[Examples and Comparative Examples in which Aromatic Compound (B) where Y is Organic Group is Used]

Examples III-1 to 22 and Comparative Examples III-1 to 6

The polycarbonate resin (A) and components presented in Tables 11 to 13 were uniformly mixed together in predetermined proportions with a tumbler mixer to obtain mixtures. Each of the mixtures was supplied to a single-screw extruder equipped with a full flight screw and a vent ("VS-40", available from Isuzu Kakouki K.K.), kneaded at a screw rotation speed of 80 rpm, a discharge rate of 20 kg/h, and a barrel temperature of 250° C., and extruded in a strand form from the tip of the extrusion nozzle. The extruded product was rapidly cooled in a water tank and cut with a pelletizer into pellets. Thereby, polycarbonate resin composition pellets were produced.

Tables 11 to 13 present the analysis and evaluation results of the resulting pellets.

TABLE 11

| | Component | Code | Example | | | | | | | |
| --- | --- | --- | --- | --- | --- | --- | --- | --- | --- | --- |
| | | | III-1 | III-2 | III-3 | III-4 | III-5 | III-6 | III-7 | III-8 |
| Amount in pellet (% by mass) | Aromatic compound (B) | B21 | 0.25 | 0.18 | 0.53 | | | | | 0.13 |
| | | B22 | | | | 0.15 | 0.12 | | | 0.07 |
| | | B23 | | | | | | 0.28 | 0.29 | |
| | Polyalkylene glycol (X) | X1 | | | | | | | | |
| | | X2 | | | | | | | | |
| | | X3 | | | | | | | | |
| | Phosphorus-based stabilizer (C) | C1 | 0.04 | 0.04 | 0.04 | 0.04 | 0.04 | 0.04 | 0.04 | 0.04 |
| | | C3 | | | | | | | | |
| | | C2 | 0.09 | 0.09 | 0.09 | 0.09 | 0.09 | 0.09 | 0.09 | 0.09 |
| | Epoxy compound (D) | D1 | | 0.04 | | | 0.04 | | 0.04 | |
| Hue (YI) (300 mm) | | | 12.45 | 11.40 | 10.50 | 13.58 | 12.86 | 15.76 | 14.58 | 13.12 |

| | Component | Code | Example | | Comparative example | | | | |
| --- | --- | --- | --- | --- | --- | --- | --- | --- | --- |
| | | | III-9 | III-10 | III-1 | III-2 | III-3 | III-4 | III-5 |
| Amount in pellet (% by mass) | Aromatic compound (B) | B21 | 0.09 | 0.13 | | | | | |
| | | B22 | 0.06 | | | | | | |
| | | B23 | | 0.14 | | | | | |
| | Polyalkylene glycol (X) | X1 | | | | 0.44 | | | |
| | | X2 | | | | | | 0.42 | |
| | | X3 | | | | | | 0.48 | 0.46 |
| | Phosphorus-based stabilizer (C) | C1 | 0.04 | 0.04 | 0.04 | 0.04 | 0.04 | 0.04 | 0.04 |
| | | C3 | | | | | | | |
| | | C2 | 0.09 | 0.09 | 0.09 | 0.09 | 0.09 | 0.09 | 0.09 |
| | Epoxy compound (D) | D1 | 0.04 | | | | | | 0.04 |
| Hue (YI) (300 mm) | | | 12.41 | 14.33 | 17.03 | 12.11 | 13.54 | 14.14 | 13.91 |

TABLE 12

| | Component | Code | Example | | Comparative example |
| --- | --- | --- | --- | --- | --- |
| | | | III-11 | III-12 | III-6 |
| Amount in pellet (% by mass) | Aromatic compound (B) | B21 | 0.23 | 0.24 | |
| | | B22 | | | |
| | | B23 | | | |
| | Phosphorus-based stabilizer (C) | C1 | | | |
| | | C3 | 0.03 | 0.03 | 0.03 |
| | | C2 | 0.09 | 0.09 | 0.09 |
| | Epoxy compound (D) | D1 | | 0.03 | |
| Hue (YI) (300 mm) | | | 15.22 | 14.78 | 17.85 |

TABLE 13

| | Component | Code | \multicolumn{10}{c}{Example} |
|---|---|---|---|---|---|---|---|---|---|---|---|---|

| | Component | Code | III-13 | III-14 | III-15 | III-16 | III-17 | III-18 | III-19 | III-20 | III-21 | III-22 |
|---|---|---|---|---|---|---|---|---|---|---|---|---|
| Amount in pellet (% by mass) | Aromatic compound (B) | B24 | 0.14 | 0.13 | | | | | | | | |
| | | B25 | | | 0.15 | 0.14 | | | | | | |
| | | B26 | | | | | 0.27 | 0.26 | | | | |
| | | B27 | | | | | | | 0.25 | 0.24 | | |
| | | B28 | | | | | | | | | 0.29 | 0.28 |
| | Phosphorus-based stabilizer (C) | C1 | 0.04 | 0.04 | 0.04 | 0.04 | 0.04 | 0.04 | 0.04 | 0.04 | 0.04 | 0.04 |
| | | C3 | | | | | | | | | | |
| | | C2 | 0.09 | 0.09 | 0.09 | 0.09 | 0.09 | 0.09 | 0.09 | 0.09 | 0.09 | 0.09 |
| | Epoxy compound (D) | D1 | | 0.04 | | 0.04 | | 0.04 | | 0.04 | | 0.04 |
| Hue (YI) (300 mm) | | | 15.10 | 13.80 | 16.26 | 13.70 | 15.62 | 14.62 | 16.37 | 15.23 | 16.00 | 14.98 |

Tables 11 to 13 reveal the following.

In Comparative examples III-1 and 6, in which the phosphorus-based stabilizer (C) is contained and the aromatic compound (B) is not contained, the hue (YI) is poor.

In each of Comparative examples III-2 to 5, in which the polyalkylene glycol (X) is used in place of the aromatic compound (B), the polyalkylene glycol (X) is incorporated in a larger amount than the amounts of the aromatic compound (B) incorporated in Examples III-1 to 10; thus, the hue is superior to that in some Examples. However, the hue should be inferior to that in Examples at a similar amount incorporated.

In contrast, the pellets containing the aromatic compound (B) represented by general formula (1) and the phosphorus-based stabilizer (C) in each of Examples III-1 to 22 can obtain the hue (YI) at a relatively small amount of the aromatic compound (B) incorporated. Further incorporation of the epoxy compound (D) results in a further improvement in hue.

Examples IV-1 to 22 and Comparative Examples IV-1 to 6

Components presented in Tables 14 to 16 were uniformly mixed together in proportions presented in Tables 14 to 16 with a tumbler mixer to obtain mixtures. Each of the mixtures was supplied to a single-screw extruder equipped with a full flight screw and a vent ("VS-40", available from Isuzu Kakouki K.K.), kneaded at a screw rotation speed of 80 rpm, a discharge rate of 20 kg/h, and a barrel temperature of 250° C., and extruded in a strand form from the tip of the extrusion nozzle. The extruded product was rapidly cooled in a water tank and cut with a pelletizer into pellets. Thereby, polycarbonate resin composition pellets were produced.

Tables 14 to 16 present the analysis and evaluation results of the resulting pellets.

TABLE 14

| | Component | Code | Example | | | | | | | |
|---|---|---|---|---|---|---|---|---|---|---|
| | | | IV-1 | IV-2 | IV-3 | IV-4 | IV-5 | IV-6 | IV-7 | IV-8 |
| Formulation of polycarbonate resin composition (parts by mass) | Polycarbonate resin (A) | A1 | 100 | 100 | 100 | 100 | 100 | 100 | 100 | 100 |
| | Aromatic compound (B) | B21 | 0.30 | 0.50 | 1.00 | | | | | 0.15 |
| | | B22 | | | | 0.30 | 0.30 | | | 0.15 |
| | | B23 | | | | | | 0.30 | 0.30 | |
| | Polyalkylene glycol (X) | X1 | | | | | | | | |
| | | X2 | | | | | | | | |
| | | X3 | | | | | | | | |
| | Phosphorus-based stabilizer (C) | C1 | 0.05 | 0.05 | 0.05 | 0.05 | 0.05 | 0.05 | 0.05 | 0.05 |
| | | C3 | | | | | | | | |
| | | C2 | 0.10 | 0.10 | 0.10 | 0.10 | 0.10 | 0.10 | 0.10 | 0.10 |
| | Epoxy compound (D) | D1 | | 0.05 | | | 0.05 | | 0.05 | |
| Amount of aromatic compound (B) or polyalkylene glycol (X) in pellet (% by mass) | | | 0.25 | 0.18 | 0.53 | 0.15 | 0.12 | 0.28 | 0.29 | 0.20 |
| Hue (YI) (300 mm) | | | 12.45 | 11.40 | 10.50 | 13.58 | 12.86 | 15.76 | 14.58 | 13.12 |

| | Component | Code | Example | | Comparative example | | | | |
|---|---|---|---|---|---|---|---|---|---|
| | | | IV-9 | IV-10 | IV-1 | IV-2 | IV-3 | IV-4 | IV-5 |
| Formulation of polycarbonate resin composition (parts by mass) | Polycarbonate resin (A) | A1 | 100 | 100 | 100 | 100 | 100 | 100 | 100 |
| | Aromatic compound (B) | B21 | 0.25 | 0.15 | | | | | |
| | | B22 | 0.15 | | | | | | |
| | | B23 | | 0.15 | | | | | |
| | Polyalkylene glycol (X) | X1 | | | | 0.50 | | | |
| | | X2 | | | | | 0.50 | | |
| | | X3 | | | | | | 0.50 | 0.50 |

TABLE 14-continued

|  |  |  |  |  |  |  |  |  |
|---|---|---|---|---|---|---|---|---|
| Phosphorus-based stabilizer (C) | C1 | 0.05 | 0.05 | 0.05 | 0.05 | 0.05 | 0.05 | 0.05 |
|  | C3 |  |  |  |  |  |  |  |
|  | C2 | 0.10 | 0.10 | 0.10 | 0.10 | 0.10 | 0.10 | 0.10 |
| Epoxy compound (D) | D1 | 0.05 |  |  |  |  |  | 0.05 |
| Amount of aromatic compound (B) or polyalkylene glycol (X) in pellet (% by mass) |  | 0.15 | 0.27 |  | 0.44 | 0.42 | 0.48 | 0.46 |
| Hue (YI) (300 mm) |  | 12.41 | 14.33 | 17.03 | 12.11 | 13.54 | 14.14 | 13.91 |

TABLE 15

|  |  |  | Example | | Comparative example |
|---|---|---|---|---|---|
| Component |  | Code | IV-11 | IV-12 | IV-6 |
| Formulation of polycarbonate resin composition (parts by mass) | Polycarbonate resin (A) | A1 | 100 | 100 | 100 |
|  | Aromatic compound (B) | B21 | 0.30 | 0.30 |  |
|  |  | B22 |  |  |  |
|  |  | B23 |  |  |  |
|  | Phosphorus-based stabilizer (C) | C1 | 0.05 | 0.05 | 0.05 |
|  |  | C3 |  |  |  |
|  |  | C2 | 0.10 | 0.10 | 0.10 |
|  | Epoxy compound (D) | D1 |  | 0.05 |  |
| Amount of aromatic compound (B) in pellet (% by mass) |  |  | 0.23 | 0.24 |  |
| Hue (YI) (300 mm) |  |  | 15.22 | 14.78 | 17.85 |

In contrast, in the case of the pellets in each of Examples IV-1 to 22, in which the aromatic compound (B) represented by general formula (1) and the phosphorus-based stabilizer (C) are incorporated and the aromatic compound (B) is contained in each pellet in a predetermined proportion, the pellets are extremely excellent in hue (YI). Further incorporation of the epoxy compound (D) results in a further improvement in hue.

[Examples in which Aromatic Compound (B) where Y is Hydrogen Atom and Aromatic Compound (B) where Y is Organic Group are Used in Combination]

Examples V-1 to 9

The polycarbonate resin (A) and components presented in Table 17 were uniformly mixed together in predetermined proportions with a tumbler mixer to obtain mixtures. Each of the mixtures was supplied to a single-screw extruder

TABLE 16

|  |  |  | Example | | | | | | | | | |
|---|---|---|---|---|---|---|---|---|---|---|---|---|
| Component |  | Code | IV-13 | IV-14 | IV-15 | IV-16 | IV-17 | IV-18 | IV-19 | IV-20 | IV-21 | IV-22 |
| Formulation of polycarbonate resin composition (parts by mass) | Polycarbonate resin (A) | A1 | 100 | 100 | 100 | 100 | 100 | 100 | 100 | 100 | 100 | 100 |
|  | Aromatic compound (B) | B24 | 0.30 | 0.30 |  |  |  |  |  |  |  |  |
|  |  | B25 |  |  | 0.30 | 0.30 |  |  |  |  |  |  |
|  |  | B26 |  |  |  |  | 0.30 | 0.30 |  |  |  |  |
|  |  | B27 |  |  |  |  |  |  | 0.30 | 0.30 |  |  |
|  |  | B28 |  |  |  |  |  |  |  |  | 0.30 | 0.30 |
|  | Phosphorus-based stabilizer (C) | C1 | 0.05 | 0.05 | 0.05 | 0.05 | 0.05 | 0.05 | 0.05 | 0.05 | 0.05 | 0.05 |
|  |  | C3 |  |  |  |  |  |  |  |  |  |  |
|  |  | C2 | 0.10 | 0.10 | 0.10 | 0.10 | 0.10 | 0.10 | 0.10 | 0.10 | 0.10 | 0.10 |
|  | Epoxy compound (D) | D1 |  | 0.05 |  | 0.05 |  | 0.05 |  | 0.05 |  | 0.05 |
| Amount of aromatic compound (B) in pellet (% by mass) |  |  | 0.14 | 0.13 | 0.15 | 0.14 | 0.27 | 0.26 | 0.25 | 0.24 | 0.29 | 0.28 |
| Hue (YI) (300 mm) |  |  | 15.10 | 13.80 | 16.26 | 13.70 | 15.62 | 14.62 | 16.37 | 15.23 | 16.00 | 14.98 |

Tables 14 to 16 reveal the following.

In Comparative example IV-1 and 6, in which the phosphorus-based stabilizer (C) is contained and the aromatic compound (B) is not contained, the hue (YI) is poor.

In each of Comparative examples IV-2 to 5, in which the polyalkylene glycol (X) is used in place of the aromatic compound (B), the polyalkylene glycol (X) is incorporated in a larger amount than the amounts of the aromatic compound (B) incorporated in Examples IV-1 to 10; thus, the hue is superior to that in some Examples. However, the hue should be inferior to that in Examples at a similar amount incorporated.

equipped with a full flight screw and a vent ("VS-40", available from Isuzu Kakouki K.K.), kneaded at a screw rotation speed of 80 rpm, a discharge rate of 20 kg/h, and a barrel temperature of 250° C., and extruded in a strand form from the tip of the extrusion nozzle. The extruded product was rapidly cooled in a water tank and cut with a pelletizer into pellets. Thereby, polycarbonate resin composition pellets were produced.

Table 17 presents the analysis and evaluation results of the resulting pellets.

TABLE 17

|  | Component | Code | V-1 | V-2 | V-3 | V-4 | V-5 | V-6 | V-7 | V-8 | V-9 |
|---|---|---|---|---|---|---|---|---|---|---|---|
| Amount in pellet (% by mass) | Aromatic compound (B) | B11 | 0.11 | 0.09 | 0.27 | 0.18 | 0.18 | 0.11 | 0.13 | 0.18 | 0.18 |
|  |  | B21 | 0.12 | 0.09 | 0.27 | 0.05 | 0.05 | 0.12 | 0.12 | 0.05 | 0.05 |
|  | Phosphorus-based stabilizer (C) | C1 | 0.04 | 0.04 | 0.04 | 0.04 | 0.04 |  |  |  |  |
|  |  | C3 |  |  |  |  |  | 0.03 | 0.03 | 0.03 | 0.03 |
|  |  | C2 | 0.09 | 0.09 | 0.09 | 0.09 | 0.09 | 0.09 | 0.09 | 0.09 | 0.09 |
|  | Epoxy compound (D) | D1 |  | 0.04 |  |  | 0.04 |  | 0.04 |  | 0.04 |
| Hue (YI) (300 mm) |  |  | 12.45 | 11.40 | 10.50 | 12.48 | 11.42 | 15.22 | 14.78 | 15.25 | 14.81 |

Examples VI-1 to 9

Components presented in Table 18 were uniformly mixed together in proportions presented in Table 18 with a tumbler mixer to obtain mixtures. Each of the mixtures was supplied to a single-screw extruder equipped with a full flight screw and a vent ("VS-40", available from Isuzu Kakouki K.K.), kneaded at a screw rotation speed of 80 rpm, a discharge rate of 20 kg/h, and a barrel temperature of 250° C., and extruded in a strand form from the tip of the extrusion nozzle. The extruded product was rapidly cooled in a water tank and cut with a pelletizer into pellets. Thereby, polycarbonate resin composition pellets were produced.

Table 18 presents the analysis and evaluation results of the resulting pellets.

TABLE 18

|  | Component | Code | VI-1 | VI-2 | VI-3 | VI-4 | VI-5 | VI-6 | VI-7 | VI-8 | VI-9 |
|---|---|---|---|---|---|---|---|---|---|---|---|
| Formulation of polycarbonate resin composition (parts by mass) | Polycarbonate resin (A) | A1 | 100 | 100 | 100 | 100 | 100 | 100 | 100 | 100 | 100 |
|  | Aromatic compound (B) | B11 | 0.25 | 0.25 | 0.50 | 0.40 | 0.40 | 0.25 | 0.25 | 0.40 | 0.40 |
|  |  | B21 | 0.25 | 0.25 | 0.50 | 0.10 | 0.10 | 0.25 | 0.25 | 0.10 | 0.10 |
|  | Phosphorus-based stabilizer (C) | C1 | 0.05 | 0.05 | 0.05 | 0.05 | 0.05 |  |  |  |  |
|  |  | C3 |  |  |  |  |  | 0.05 | 0.05 | 0.05 | 0.05 |
|  |  | C2 | 0.10 | 0.10 | 0.10 | 0.10 | 0.10 | 0.10 | 0.10 | 0.10 | 0.10 |
|  | Epoxy compound (D) | D1 |  | 0.05 |  |  | 0.05 |  | 0.05 |  | 0.05 |
| Amount of aromatic compound (B) in pellet (% by mass) |  |  | 0.23 | 0.18 | 0.54 | 0.23 | 0.23 | 0.23 | 0.25 | 0.23 | 0.23 |
| Hue (YI) (300 mm) |  |  | 12.45 | 11.40 | 10.50 | 12.48 | 11.42 | 15.22 | 14.78 | 15.25 | 14.81 |

Tables 17 and 18 reveal that even when the aromatic compound (B) where Y is a hydrogen atom and the aromatic compound (B) where Y is an organic group are used in combination as the aromatic compound (B), as with the case of using each of them individually, the effect of satisfactorily improving the hue can be provided.

[Evaluation of Heat Aging Properties]

In Examples I-1, I-7, and I-21, Comparative examples I-3 and I-14, Examples II-1, II-7, and II-21, and Comparative examples II-3 and II-14, molded articles having an optical path length of 300 mm (6 mm×4 mm×300 mm, L/d=50) were produced for the evaluation of the hue (YI) with an injection molding machine ("EC100", available from Toshiba Machine Co., Ltd.) at a temperature of 280° C. The molded articles were subjected to heat treatment in a hot-air dryer (Espec PHH-102) at 120° C. for 500 hours. The hue (YI) before and after the heat treatment was measured with a long path-length transmission spectrophotometer ("ASA 1", available from Nippon Denshoku Industries Co., Ltd.) in terms of the YI value at a length of 300 mm, and a hue difference (ΔYI) before and after the treatment was determined. Tables 19 and 20 present the results.

TABLE 19

|  |  |  | Example | | | Comparative example | |
|---|---|---|---|---|---|---|---|
| Component | | Code | I-4 | I-7 | I-21 | I-3 | I-14 |
| Amount in pellet (% by mass) | Aromatic compound (B) | B11 | 0.18 |  | 0.26 |  |  |
|  |  | B12 |  | 0.44 |  |  |  |
|  | Polyalkylene glycol (X) | X1 |  |  |  |  |  |
|  |  | X2 |  |  |  | 0.42 | 0.43 |
|  |  | X3 |  |  |  |  |  |
|  | Phosphorus-based stabilizer (C) | C1 | 0.04 | 0.04 |  | 0.04 | 0.04 |
|  |  | C3 |  |  | 0.03 |  |  |
|  |  | C2 | 0.09 | 0.09 | 0.09 | 0.09 | 0.09 |
|  | Epoxy compound (D) | D1 | 0.04 | 0.04 | 0.04 |  | 0.04 |
| Hue before and after treatment at 120° C. for 500 hours (ΔYI) (300 mm) | | | 5.2 | 5.2 | 7.7 | 23.3 | 18.6 |

TABLE 20

|  |  |  | Example | | | Comparative example | |
|---|---|---|---|---|---|---|---|
| Component | | Code | II-4 | II-7 | II-21 | II-3 | II-14 |
| Formulation of polycarbonate resin composition | Polycarbonate resin (A) | A1 | 100 | 100 | 100 | 100 | 100 |
|  | Aromatic compound (B) | B11 | 0.50 |  | 0.30 |  |  |
|  |  | B12 |  | 0.50 |  |  |  |
|  | Polyalkylene | X1 |  |  |  |  |  |

TABLE 20-continued

| | Component | Code | Example II-4 | Example II-7 | Example II-21 | Comparative example II-3 | Comparative example II-14 |
|---|---|---|---|---|---|---|---|
| (parts by mass) | glycol (X) | X2 | | | | 0.50 | 0.50 |
| | | X3 | | | | | |
| | Phosphorus-based stabilizer (C) | C1 | 0.05 | 0.05 | | 0.05 | 0.05 |
| | | C3 | | | 0.05 | | |
| | | C2 | 0.10 | 0.10 | 0.10 | 0.10 | 0.10 |
| | Epoxy compound (D) | D1 | 0.05 | 0.05 | 0.05 | | 0.05 |
| Amount of aromatic compound (B) or polyalkylene glycol (X) in pellet (% by mass) | | | 0.18 | 0.44 | 0.26 | 0.42 | 0.43 |
| Hue before and after treatment at 120° C. for 500 hours (ΔYI) (300 mm) | | | 5.2 | 5.2 | 7.7 | 23.3 | 18.6 |

Tables 19 and 20 reveal that the incorporation of the aromatic compound (B) can improve the hue after the heat treatment as well as the hue before the heat treatment and can reduce the hue difference (ΔYI).

The present invention has been described in detail based on specific embodiments. However, it is obvious for those skilled in the art that various modifications can be made without departing from the intention and scope of the present invention.

The present application is based on Japanese Patent Application No. 2018-074839 filed on Apr. 9, 2018, Japanese Patent Application No. 2018-102497 filed on May 29, 2018, Japanese Patent Application No. 2018-156515 filed on Aug. 23, 2018, Japanese Patent Application No. 2018-220382 filed on Nov. 26, 2018, Japanese Patent Application No. 2019-011382 filed on Jan. 25, 2019, Japanese Patent Application No. 2018-074840 filed on Apr. 9, 2018, Japanese Patent Application No. 2018-102498 filed on May 29, 2018, Japanese Patent Application No. 2018-156516 filed on Aug. 23, 2018, Japanese Patent Application No. 2018-220383 filed on Nov. 26, 2018, Japanese Patent Application No. 2018-165433 filed on Sep. 4, 2018, Japanese Patent Application No. 2018-220384 filed on Nov. 26, 2018, Japanese Patent Application No. 2018-165434 filed on Sep. 4, 2018, Japanese Patent Application No. 2018-220385 filed on Nov. 26, 2018, and Japanese Patent Application No. 2019-011383 filed on Jan. 25, 2019, the entire contents of which are incorporated herein by reference.

The invention claimed is:

1. A light guide member, obtained by molding a polycarbonate resin composition pellet comprising:
   a polycarbonate resin (A);
   0.001% to 1% by mass of an aromatic compound (B) represented by formula (1) below; and
   0.003% to 0.5% by mass of a phosphorus-based stabilizer (C),

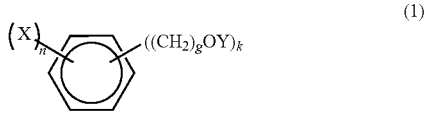

(1)

wherein, in formula (1), Y is a hydrogen atom or a first organic group that does not comprise nitrogen, sulfur, or a halogen, wherein when Y is a hydrogen atom, X is an alkyl group or an optionally substituted aryl group, and when Y is the first organic group, X is a second organic group that does not comprise nitrogen, sulfur, or a halogen, and that is the same as or different from the first organic group, g is an integer of 1 or 2, n is an integer of 0 to 5, wherein when n is 2 or more, n X groups are the same as or different from each other, and k is an integer of 1 to 4, wherein when k is 2 or more, two or more —(CH$_2$)$_g$OY groups in which each Y is the first organic group are the same as or different from each other, provided that n+k is 6 or less, wherein the polycarbonate resin composition pellet comprises as the phosphorus-based stabilizer (C):

0.001% to 0.5% by mass of a phosphite-based stabilizer (C-I) having a Spiro ring skeleton; and 0.001% to 0.5% by mass of a phosphite-based stabilizer (C-II) represented by formula (II) below,

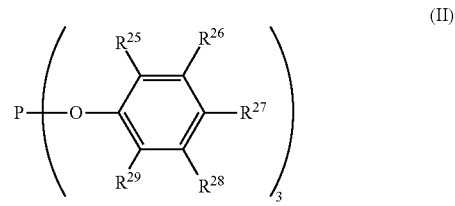

(II)

wherein, in formula (II), $R^{25}$ to $R^{29}$ each independently represent a hydrogen atom, an aryl group having 6 to 20 carbon atoms, or an alkyl group having 1 to 20 carbon atoms, wherein a ratio by mass of an amount of the phosphite-based stabilizer (C-I) to the phosphite-based stabilizer (C-II) contained in the pellet is 1:1 to 15.

2. The light guide member of claim 1, wherein the phosphorus-based stabilizer (C) comprises bis(2,6-di-tert-butyl-4-methylphenyl) pentaerythritol diphosphite and/or bis(2,4-dicumylphenyl)pentaerythritol diphosphite.

3. The light guide member of claim 1, wherein the phosphorus-based stabilizer (C) comprises tris(2,4-di-tert-butylphenyl) phosphite.

4. The light guide member of claim 1, wherein the aromatic compound (B) represented by formula (1) is represented by formula (1A) below:

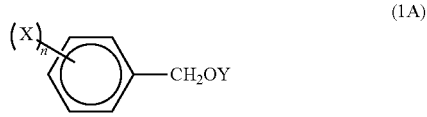

(1A)

wherein, in formula (1A), X, Y, and n are as defined in formula (1).

5. The light guide member of claim 1, wherein, in formula (1), X is an alkyl group having 1 to 4 carbon atoms or an optionally substituted phenyl group, and Y is a hydrogen atom.

6. The light guide member of claim 5, wherein the aromatic compound (B) is one or more selected from the group consisting of benzyl alcohol (phenylmethanol), 4-phenylbenzyl alcohol (4-phenylphenylmethanol), 2-methylphenylmethanol, 4-methylphenylmethanol, 4-tert-butylphenylmethanol, and 1,4-benzenedimethanol.

7. The light guide member of claim 1, wherein, in formula (1), X is an alkyl group or an optionally substituted aryl group, and Y is an alkyl group having 1 to 8 carbon atoms, —(CH$_2$)$_m$OH where m is an integer of 1 to 4, —CH$_2$CH$_2$—O—CH$_2$CH$_2$—OH, an optionally substituted phenyl group, a benzyl group optionally having a substituent on a benzene ring, —CH$_2$—CH=CH$_2$, —C(=O)—(CH$_2$)$_j$—CH$_3$ where j is an integer of 0 to 3, or —C(=O)—C$_6$H$_5$.

8. The light guide member of claim 1, wherein the polycarbonate resin composition pellet further comprises 0.01% to 0.5% by mass of an epoxy compound (D) and/or an oxetane compound (E).

9. A method for producing a light guide member, the method comprising:
melt-kneading a polycarbonate resin composition comprising 100 parts by mass of a polycarbonate resin (A), 0.05 to 2 parts by mass of an aromatic compound (B) represented by formula (1) below, and 0.003 to 0.5 parts by mass of a phosphorus-based stabilizer (C), to produce a polycarbonate resin composition pellet comprising 0.001% to 1% by mass of the aromatic compound (B); and
molding the polycarbonate resin composition pellet, to produce a light guide member,

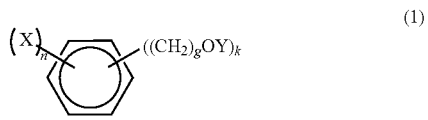

(1)

wherein, in formula (1), Y is a hydrogen atom or a first organic group that does not comprise nitrogen, sulfur, or a halogen, wherein when Y is a hydrogen atom, X is an alkyl group or an aryl group optionally having a substituent, when Y is the first organic group, X is a second organic group that does not comprise nitrogen, sulfur, or a halogen, and that is the same as or different from the first organic group,
g is an integer of 1 or 2,
n is an integer of 0 to 5, wherein when n is 2 or more, n X groups are the same as or different from each other, and
k is an integer of 1 to 4, wherein when k is 2 or more, two or more —(CH$_2$)$_g$OY groups in which each Y is the first organic group are the same as or different from each other, provided that n+k is 6 or less,
wherein the polycarbonate resin composition comprises, as the phosphorus-based stabilizer (C):
0.001 to 0.5 parts by mass of a phosphite-based stabilizer (C-I) having a spiro ring skeleton, based on 100 parts by mass of the polycarbonate resin (A); and
0.001 to 0.5 parts by mass of a phosphite-based stabilizer (C-II) represented by formula (II) below, based on 100 parts by mass of the polycarbonate resin (A),

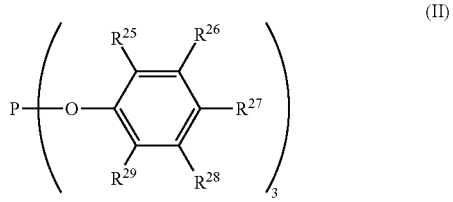

(II)

wherein, in formula (II), R$^{25}$ to R$^{29}$ each independently represent a hydrogen atom, an aryl group having 6 to 20 carbon atoms, or an alkyl group having 1 to 20 carbon atoms,
wherein a ratio by mass of an amount of the phosphite-based stabilizer (C-I) to the phosphite-based stabilizer (C-II) contained in the polycarbonate resin composition is 1:1 to 15.

10. The method of claim 9, wherein the phosphorus-based stabilizer (C) comprises bis(2,6-di-tert-butyl-4-methylphenyl) pentaerythritol diphosphite and/or bis(2,4-dicumylphenyl)pentaerythritol diphosphite.

11. The method of claim 9, wherein the phosphorus-based stabilizer (C) comprises tris(2,4-di-tert-butylphenyl) phosphite.

12. The method of claim 9, wherein the aromatic compound (B) represented by formula (1) is represented by formula (1A) below:

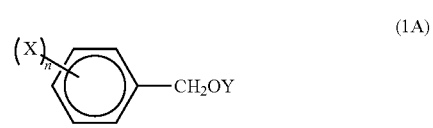

(1A)

wherein, in formula (1A), X, Y, and n are as defined in formula (1).

13. The method of claim 9, wherein in formula (1), X is an alkyl group having 1 to 4 carbon atoms or an optionally substituted phenyl group, and Y is a hydrogen atom.

14. The method of claim 13, wherein the aromatic compound (B) is one or more selected from the group consisting of benzyl alcohol (phenylmethanol), 4-phenylbenzyl alcohol (4-phenylphenylmethanol), 2-methylphenylmethanol, 4-methylphenylmethanol, 4-tert-butylphenylmethanol, and 1,4-benzenedimethanol.

15. The method of claim 9, wherein, in formula (1), X is an alkyl group or an optionally substituted aryl group, and Y is an alkyl group having 1 to 8 carbon atoms, —(CH$_2$)$_m$OH where m is an integer of 1 to 4, —CH$_2$CH$_2$—O—CH$_2$CH$_2$—OH, an optionally substituted phenyl group, a benzyl group optionally having a substituent on a benzene ring, —CH$_2$—CH=CH$_2$, —C(=O)—(CH$_2$)$_j$—CH$_3$ where j is an integer of 0 to 3, or —C(=O)—C$_6$H$_5$.

16. The method of claim 9, wherein the polycarbonate resin composition further comprises 0.01 to 0.5 parts by mass of an epoxy compound (D) and/or an oxetane compound (E).

17. The method of claim 9, wherein a temperature of the melt kneading is 240° C. to 320° C.

18. A light guide member, obtained by the method of claim 9.

* * * * *